US010848224B2

(12) United States Patent
Park et al.

(10) Patent No.: US 10,848,224 B2
(45) Date of Patent: Nov. 24, 2020

(54) METHOD AND APPARATUS FOR REPORTING CHANNEL STATE INFORMATION IN A WIRELESS COMMUNICATION SYSTEM

(71) Applicant: LG Electronics Inc., Seoul (KR)

(72) Inventors: Haewook Park, Seoul (KR); Kijun Kim, Seoul (KR); Jiwon Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/148,800

(22) Filed: Oct. 1, 2018

(65) Prior Publication Data
US 2019/0109626 A1 Apr. 11, 2019

Related U.S. Application Data

(60) Provisional application No. 62/591,698, filed on Nov. 28, 2017, provisional application No. 62/570,098, (Continued)

(51) Int. Cl.
H04B 7/06 (2006.01)
H04L 5/00 (2006.01)
(Continued)

(52) U.S. Cl.
CPC ......... H04B 7/0626 (2013.01); H04B 7/0486 (2013.01); H04B 7/0636 (2013.01);
(Continued)

(58) Field of Classification Search
CPC .. H04B 7/0626; H04B 7/0636; H04B 7/0643; H04B 7/0417; H04B 7/063;
(Continued)

(56) References Cited

U.S. PATENT DOCUMENTS 9,509,390 B2  11/2016 Kim et al.
9,621,243 B2 *  4/2017 Chen ................... H04B 7/0469
(Continued)

FOREIGN PATENT DOCUMENTS

EP          3142408         3/2017
KR    20130121665 A  *  11/2013  .......... H04L 1/1671
(Continued)

OTHER PUBLICATIONS

Rico Alvarino et al. U.S. Appl. No. 62/544,198 (Prov'198) filed Aug. 11, 2017 (Year: 2017).*
(Continued)

Primary Examiner — Wutchung Chu
(74) Attorney, Agent, or Firm — Fish & Richardson P.C.

(57) ABSTRACT

A method and an apparatus for reporting channel state information (CSI) by a user equipment in a wireless communication system. According to the present invention, the UE receives configuration information related to reporting of the CSI from a base station, wherein the configuration information may include a threshold value related to a specific condition for receiving the CSI and the CSI may comprise a first part and a second part. A method and an apparatus may be provided in which the UE receives a first reference signal for channel measurement from the base station, measures a channel based on the first reference signal, and reports the CSI of the measured channel to the base station and some or all of the second part of the CSI is omitted.

20 Claims, 26 Drawing Sheets

Related U.S. Application Data filed on Oct. 10, 2017, provisional application No. 62/566,517, filed on Oct. 1, 2017, provisional application No. 62/565,170, filed on Sep. 29, 2017.

(51) Int. Cl.
| | |
|---|---|
| *H04L 1/00* | (2006.01) |
| *H04W 76/27* | (2018.01) |
| *H04B 7/0456* | (2017.01) |
| *H04W 72/04* | (2009.01) |

(52) U.S. Cl.
CPC ......... *H04B 7/0639* (2013.01); *H04L 1/0026* (2013.01); *H04L 1/0027* (2013.01); *H04L 5/0048* (2013.01); *H04W 72/042* (2013.01); *H04W 76/27* (2018.02)

(58) Field of Classification Search
CPC ... H04B 7/0486; H04B 7/0639; H04L 1/0026; H04L 5/0094; H04L 1/0025; H04L 1/0039; H04L 5/0053; H04L 5/0057; H04L 1/0079; H04L 1/1607; H04L 5/0048; H04L 1/0009; H04L 5/0044; H04L 5/0058; H04L 5/0078; H04L 1/003; H04L 1/0073; H04W 72/0413; H04W 72/0446; H04W 88/02; H04W 28/06; H04W 72/1284; H04W 72/14; H04W 76/27; H04W 72/042
See application file for complete search history.

(56) References Cited

U.S. PATENT DOCUMENTS

| | | | | |
|---|---|---|---|---|
| 9,882,624 | B2* | 1/2018 | Abraham | H04B 7/0626 |
| 10,374,773 | B2* | 8/2019 | Lin | H04L 1/0026 |
| 2009/0199055 | A1* | 8/2009 | Chen | H03M 13/356 |
| | | | | 714/701 |
| 2012/0257605 | A1* | 10/2012 | Abraham | H04L 5/0094 |
| | | | | 370/338 |
| 2013/0322376 | A1* | 12/2013 | Marinier | H04B 17/24 |
| | | | | 370/329 |
| 2014/0003452 | A1* | 1/2014 | Han | H04L 1/1657 |
| | | | | 370/474 |
| 2014/0105110 | A1* | 4/2014 | Hoshino | H04W 52/325 |
| | | | | 370/328 |
| 2014/0169204 | A1* | 6/2014 | Cheng | H04L 1/0072 |
| | | | | 370/252 |
| 2015/0117352 | A1* | 4/2015 | Nammi | H04L 12/00 |
| | | | | 370/329 |
| 2015/0200746 | A1* | 7/2015 | Pan | H04L 1/0033 |
| | | | | 370/329 |
| 2015/0365181 | A1* | 12/2015 | Nagata | H04L 1/00 |
| | | | | 370/329 |
| 2016/0105817 | A1* | 4/2016 | Frenne | H04L 5/0053 |
| | | | | 370/252 |
| 2016/0183244 | A1* | 6/2016 | Papasakellariou | H04L 5/001 |
| | | | | 370/329 |
| 2016/0295573 | A1* | 10/2016 | Lee | H04L 1/1812 |
| 2017/0222693 | A1* | 8/2017 | Shen | H04B 7/0408 |
| 2018/0034612 | A1* | 2/2018 | Lin | H04L 5/0048 |
| 2018/0139639 | A1* | 5/2018 | Aiba | H04L 5/0053 |
| 2018/0167116 | A1* | 6/2018 | Rahman | H04B 7/04 |
| 2018/0227156 | A1* | 8/2018 | Papasakellariou | H04L 27/2613 |
| 2018/0255566 | A1* | 9/2018 | Takeda | H04L 5/0042 |
| 2018/0278315 | A1* | 9/2018 | Wu | H04B 7/0626 |
| 2019/0053097 | A1* | 2/2019 | Rico Alvarino | H04L 5/0057 |
| 2019/0059013 | A1* | 2/2019 | Rahman | H04B 7/088 |
| 2019/0074882 | A1* | 3/2019 | Zhou | H04W 52/146 |

FOREIGN PATENT DOCUMENTS

| | | | | |
|---|---|---|---|---|
| KR | 20160106094 A | * | 9/2016 | ............ H04W 72/04 |
| WO | WO2016122254 | | 8/2016 | |
| WO | WO-2019028878 A1 | * | 2/2019 | |

OTHER PUBLICATIONS

Zhou et al. U.S. Appl. No. 62/555,359 (Prov'359) filed Sep. 7, 2017 (Year: 2017).*
CN109510654A Channel state information feedback method and device; filed on Sep. 14, 2017 (Year: 2017).*
Samsung, R1-1705346, Discussions on CSI measurements and reporting for NR, 3GPP TSG RAN WG1 #88bis, 3GPP Mar. 24, 2017) See p. 1-2. (Year: 2017).*
Huawei et al., R1-1705138, Corrections on the dropping rules in hybrid CSI in 36.213, 3GPP TSG RAN WG1 #88bis, 3GPP (Mar. 25, 2017) See p. 2. (Year: 2017).*
Samsung, "WF for Open Issues on CSI Reporting," R1-1716901, 3GPP TSG-RAN WG1 NR-AH3, Nagoya, Japan, Sep. 18-21, 2017, 18 pages.
Nokia, "WF on Reduced PMI Payload in Type II Codebook," R1-1715002, 3GPP TSG-RAN WG1#90, Prague, Czech Republic, Aug. 21-25, 2017, 9 pages.
CATT, "Issues on CSI acquisition," R1-1808374, 3GPP TSG RAN WG1 Meeting #94, Gothenburg, Sweden, dated Aug. 20-24, 2018, 10 pages.
Extended European Search Report in European Application No. 18863496.8, dated May 28, 2020, 13 pages.
Huawei, HiSilicon, "Details of CSI reporting on PUCCH/PUSCH," R1-1715466, 3GPP TSG RAN WG1 Meeting NR#3, Nagoya, Japan, dated Sep. 18-21, 2017, 9 pages.
Qualcomm Incorporated, "Discussion on maximumCodeRate applicability for reporting over PUSCH," R1-1712767, 3GPP TSG RAN WG1 Meeting #90, Prague, Czechia, dated Aug. 21-25, 2017, 3 pages.
Qualcomm Incorporated, "Remaining Issues on CSI Reporting," R1-1800858, 3GPP TSG RAN WG1 Meeting AH 1801, Vancouver, Canada, dated Jan. 22-26, 2018, 6 pages.
ZTE, Sanechips, "Remaining details on CSI reporting," R1-1715439, 3GPP TSG RAN WG1 Meeting NR #3, Nagoya, Japan, dated Sep. 18-21, 2017, 8 pages.

* cited by examiner

FIG. 5
(a)
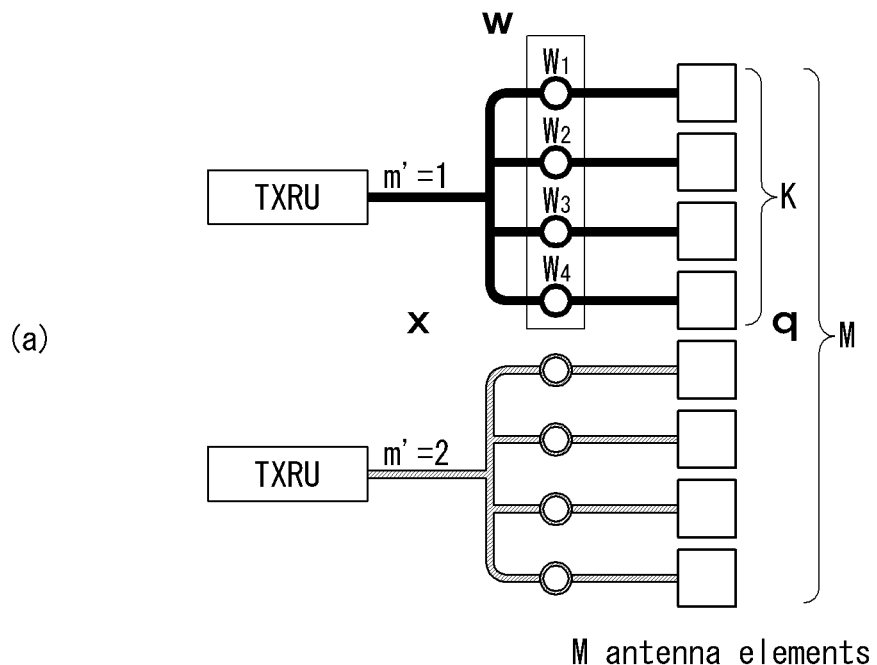
(b)
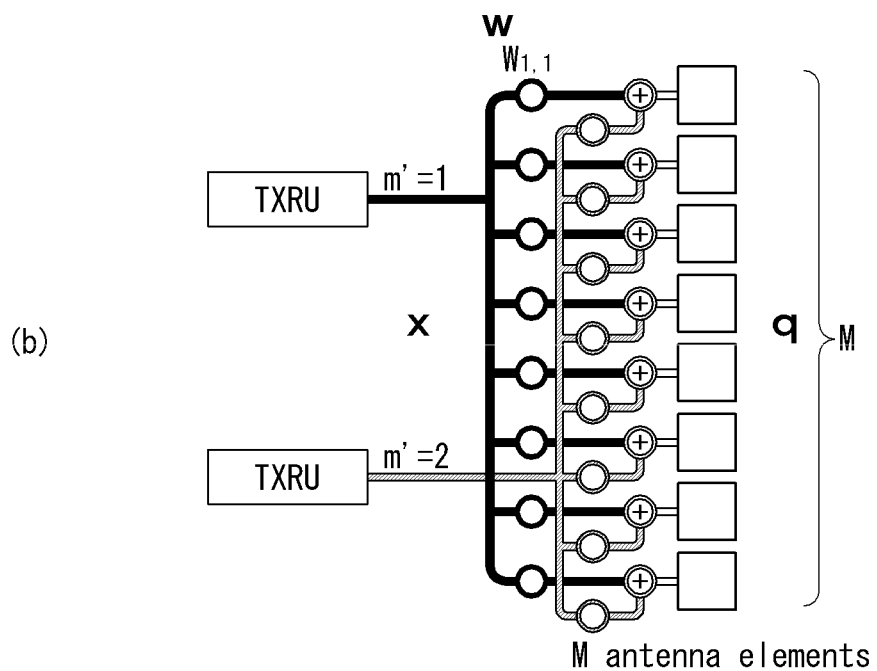

FIG. 21

High priority Low priority

| Part 2 WB CSI + SB CSI with offset 0 for CC index 0 | Part 2 WB CSI + SB CSI with offset 0 for CC index 1 | . . . | Part 2 WB CSI + SB CSI with offset 0 for CC index N-1 | Part 2 SB CSI with offset 1 for CC index 0 | Part 2 SB CSI with offset 1 for CC index 1 | . . . | Part 2 SB CSI with offset 1 for CC index N-1 |

High priority Low priority

| Part 1 CSI + WB CSI for all CC index (0~N-1) | Part 2 SB CSI with offset 0 for CC index 0 | Part 2 SB CSI with offset 0 for CC index 1 | . . . | Part 2 SB CSI with offset 0 for CC index N-1 | Part 2 SB CSI with offset 1 for CC index 0 | Part 2 SB CSI with offset 1 for CC index 1 | . . . | Part 2 SB CSI with offset 1 for CC index N-1 |

FIG. 22

High priority Low priority

| Part 1 CSI for CC index 0 | Part 2 WB CSI + SB CSI with offset 0 for CC index 0 | Part 2 SB CSI with offset 1 for CC index 0 | ... | Part 1 CSI for CC index N-1 | Part 2 WB CSI + SB CSI with offset 0 for CC index N-1 | Part 2 SB CSI with offset 1 for CC index N-1 |

| Part 1 CSI for CC index 0~N-1 | Part 2 WB CSI for CC index 0~N-1 | Part 2 SB CSI with offset 0 for CC index 0 | Part 2 SB CSI with offset 1 for CC index 0 | ... | Part 2 SB CSI with offset 0 for CC index N-1 | Part 2 SB CSI with offset 1 for CC index N-1 |

| Part 1 CSI for CC index 0~N-1 | Part 2 WB CSI + SB CSI with offset 0 for CC index 0 | Part 2 SB CSI with offset 1 for CC index 0 | ... | Part 2 WB CSI + SB CSI with offset 0 for CC index N-1 | Part 2 SB CSI with offset 1 for CC index N-1 |

METHOD AND APPARATUS FOR REPORTING CHANNEL STATE INFORMATION IN A WIRELESS COMMUNICATION SYSTEM

CROSS-REFERENCE TO RELATED APPLICATIONS

This application priority to Provisional Application No. 62/565,170 filed on 29 Sep. 2017, Ser. No. 62/570,098 field on 10 Oct. 2017, Ser. No. 62/566,517 filed on 1 Oct. 2017 and Ser. No. 62/591,698 filed on 28 Nov. 2017 in US the entire contents of which is hereby incorporated by reference in its entirety.

BACKGROUND OF THE INVENTION

Field of the Invention

The present invention relates to a wireless communication system, and more particularly, to a method for transmitting and receiving channel state information in a wireless communication system and an apparatus therefor.

Related Art

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

SUMMARY OF THE INVENTION

The present invention provides a method and an apparatus of transmitting and receiving a channel status information (CSI)-reference signal (RS) in a wireless communication system.

The present invention also provides a scheme that configures feedback contents when feeding back CSI according to a configuration scheme of a codebook in a wireless communication system.

The present invention also provides a method and apparatus for reporting, when a specific condition for reporting the CSI by a base station is established, the CSI according to the specific condition.

The present invention also provides a method and apparatus for adjusting, when a size of the CSI which a user equipment is to report to the base station is larger than a size allocated from the base station, the size of the CSI.

The present invention also provides a method and apparatus for reporting the CSI by the base station when a specific coding rate for reporting the CIS is set.

The present invention also provides a method and apparatus for omitting all or some of the CSI when a specific coding rate set by the base station configured by the user equipment is not satisfied.

The technical objects of the present invention are not limited to the aforementioned technical objects, and other technical objects, which are not mentioned above, will be apparently appreciated by a person having ordinary skill in the art from the following description.

In an aspect, provided is a method for reporting, by a user equipment, channel state information (CSI) in a wireless communication system, which includes: receiving configuration information related to reporting of the CSI from a base station, wherein the configuration information includes a threshold value related with a specific condition for receiving the CSI, and wherein the CSI comprises a first part and a second part; receiving a first reference signal for channel measurement; measuring a channel based on the first reference signal; and reporting the CSI of the measured channel to the base station, wherein the CSI is omitted some or all of the second part based on the specific condition.

Further, in the present invention, the specific condition is a threshold value of a coding rate of the CSI.

In addition, in the present invention, when the threshold value is smaller than the coding rate of the CSI, some or all of the second part is omitted.

Further, in the present invention, the second part is omitted until the threshold value and the coding rate of the CSI are the same as each other.

In addition, in the present invention, the second part is constituted by a plurality of subbands and is omitted based on a priority of each of the plurality of subbands.

Further, in the present invention, the plurality of subbands is omitted according to an order in which the priority is low.

In addition, in the present invention, the configuration information is transmitted through downlink control information (DCI) or RRC signaling.

Further, in the present invention, the DCI includes at least one of pattern information, omission rate information, or specific subband information related with the omitted subband among the plurality of subbands constituting the second part.

In addition, in the present invention, the pattern information includes an offset value and a Comp value representing a pattern of the omitted subband.

Further, in the present invention, the first part includes a rank indicator (RI), a channel quality indicator (CQI), and an indicator indicating the number of beams having an amplitude other than 0 and the second part includes a precoding matrix indicator (PMI).

In addition, in another aspect, provided is a method for method for receiving, by a base station, channel state information (CSI) from a user equipment in a wireless communication system, which includes: transmitting configuration information related with reporting of the CSI to the user equipment, wherein the configuration information includes a threshold value related with a specific condition for receiving the CSI, and wherein the CSI comprises by a first part and a second part; transmitting a first reference signal for measuring a channel to the user equipment; and receiving the CSI of the measured channel from the user equipment, wherein the CSI is omitted some or all of the second part based on the specific condition.

Further, in yet another aspect, provided is a user equipment for reporting channel state information (CSI) in a wireless communication system, which includes: a radio frequency (RF) module transmitting and receiving a radio signal; and a processor controlling the RF module, wherein the processor is configured to receive configuration information related to reporting of the CSI from a base station, wherein the configuration information includes a threshold value related with a specific condition for receiving the CSI, and wherein the CSI comprises a first part and a second part, receives a first reference signal for channel measurement, measures a channel based on the first reference signal, and reports the CSI of the measured channel to the base station, and wherein the CSI is some or all of the second part omitted based on the specific condition.

According to an embodiment of the present invention, since a payload size of CSI can be decided according to a configuration scheme of the CSI, the payload size of the CSI can be optimized.

Further, according to an embodiment of the present invention, some or all of CSI configured by a user equipment is omitted to satisfy a size or a coding rate of a payload for CSI allocated by a base station.

In addition, according to an embodiment of the present invention, the user equipment transmits CSI including information related with whether the CSI is omitted to the base station to notify omission of the CSI and an omitted part to the base station.

Further, according to an embodiment of the present invention, CSI omission and/or an omitted CSI part are/is notified to the base station, and as a result, the base station can perform an operation by considering the omitted part.

Advantages which can be obtained in the present invention are not limited to the aforementioned advantages and other unmentioned advantages will be clearly understood by those skilled in the art from the following description.

Although a scheme of mapping a reference signal in a wireless communication system of the present invention has been described with reference to an example applied to a 3GPP LTE/LTE-A system or a 5G system (New RAT system), the scheme may be applied to various wireless communication systems in addition to the 3GPP LTE/LTE-A system or 5G system.

BRIEF DESCRIPTION OF THE DRAWINGS

In order to help understanding of the present invention, the accompanying drawings which are included as a part of the Detailed Description provide embodiments of the present invention and describe the technical features of the present invention together with the Detailed Description.

FIG. 5 illustrates a transceiver unit model in the wireless communication system to which the method proposed in the present specification may be applied.

FIGS. 21 to 22 are diagrams illustrating an example of a method for omitting CSI according to a priority, which is proposed in the present specification.

DESCRIPTION OF EXEMPLARY EMBODIMENTS

Figure 1:
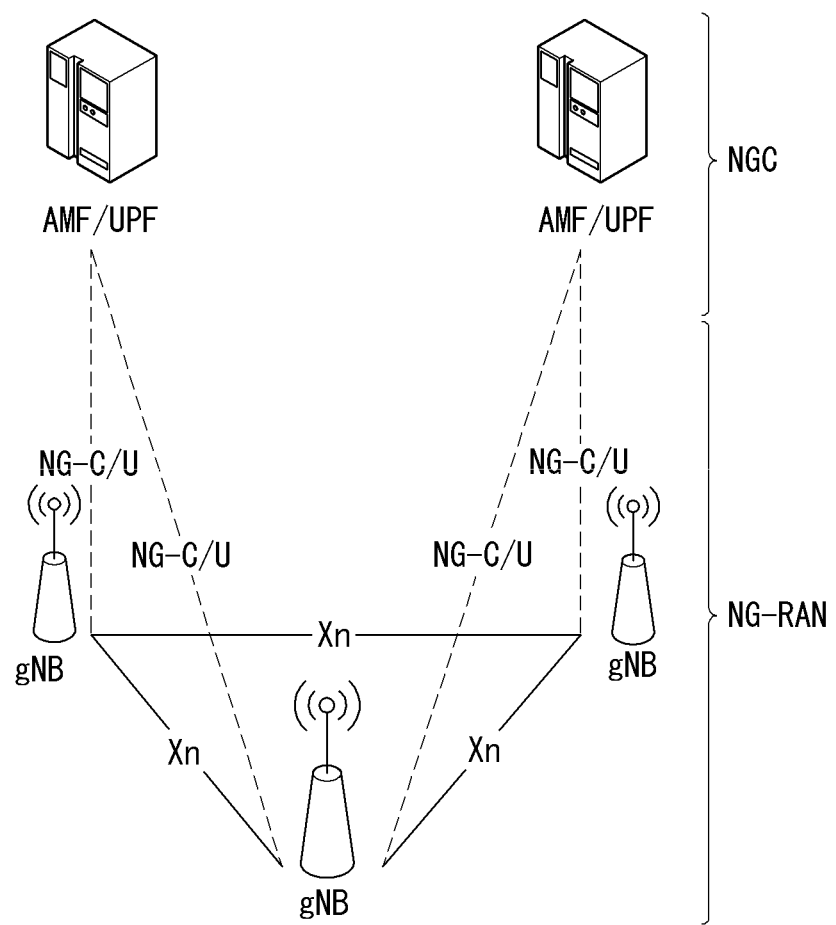
FIG. 1 is a diagram illustrating an example of an overall system structure of NR to which a method proposed in the present specification may be applied.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (Wi-MAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

NR (New Rat) Numerology and frame structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_f=(\Delta f_{max} N_f/1000) \cdot T_s=1$ ms. In this case, there may be a set of UL frames and a set of DL frames.

Figure 2:
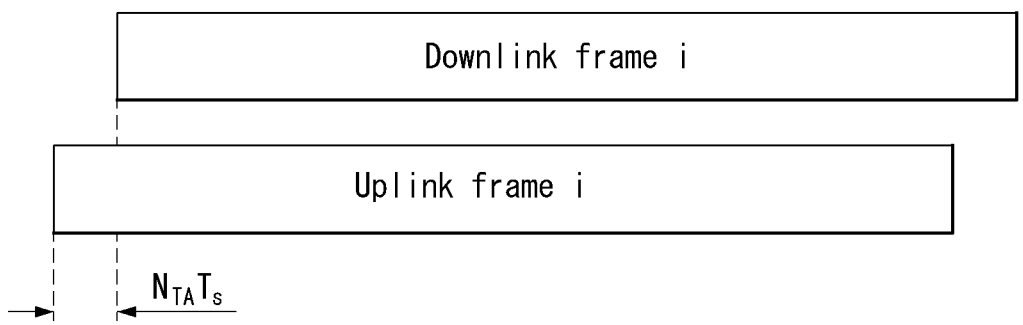
FIG. 2 illustrates a relationship between an uplink frame and a downlink frame in a wireless communication system to which the method proposed in the present specification may be applied.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology $\mu$, slots are numbered in ascending order of $n_s^\mu \in \{0, \ldots, N_{subframe}^{slots,\mu}-1\}$ in a subframe, and in ascending order of $n_{s,f}^\mu \in \{0, \ldots, N_{frame}^{slots,\mu}-1\}$ a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology $\mu$, and Table 3 shows the number of OFDM symbols per slot for an extended CP in the numerology $\mu$.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 3:
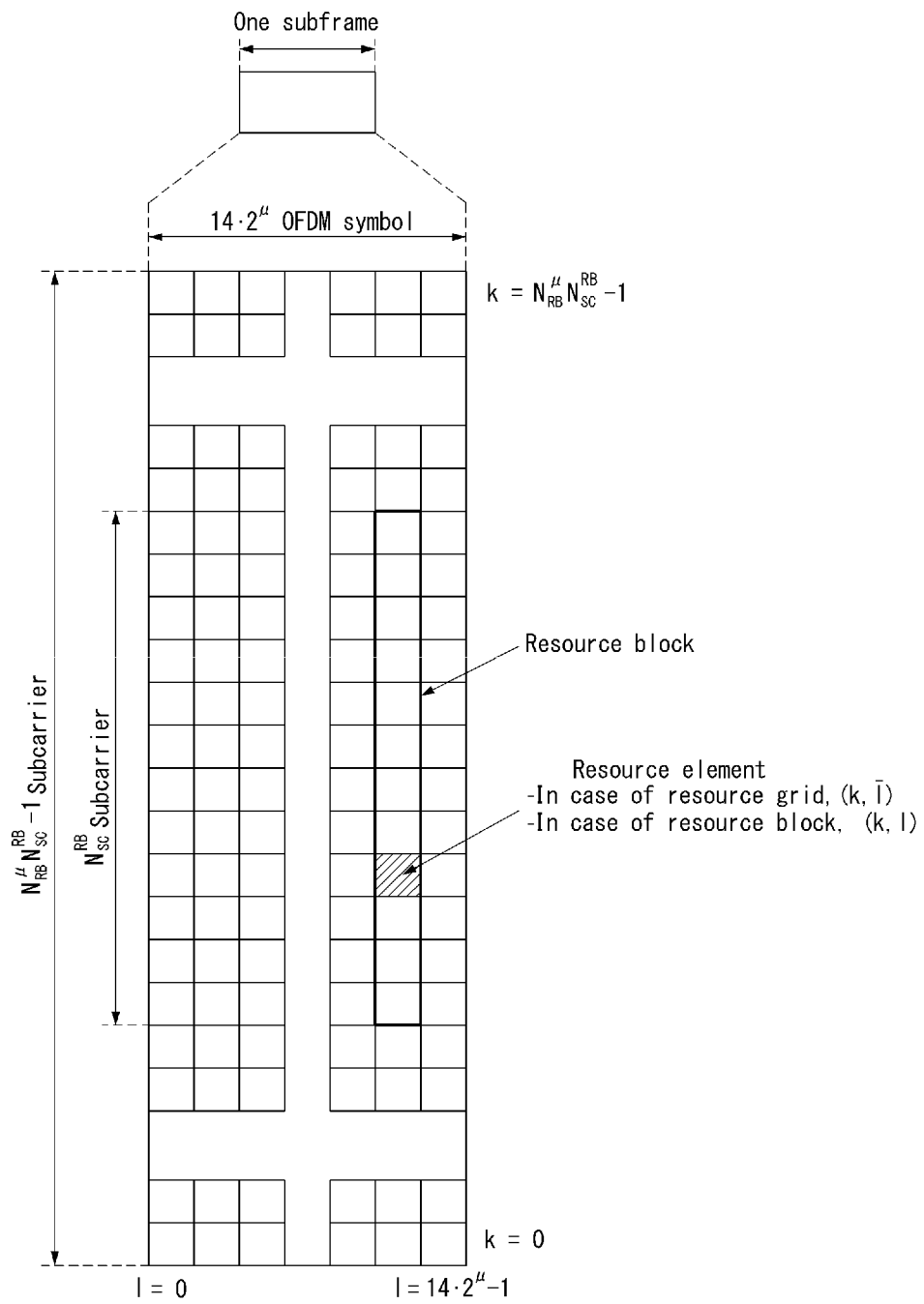
FIG. 3 illustrates an example of a resource grid supported in the wireless communication system to which the method proposed in the present specification may be applied.

FIG. 3 illustrates an example of a resource grid supported in a wireless communication system to which a method proposed by the present disclosure may be implemented.

Referring to FIG. 3, a resource grid is composed of $N_{RB}^\mu N_{sc}^{RB}$ subcarriers in a frequency domain, each subframe composed of $14 \cdot 2\mu$ OFDM symbols, but the present disclosure is not limited thereto.

In the NR system, a transmitted signal is described by one or more resource grids, composed of $N_{RB}^\mu N_{sc}^{RB}$ subcarriers, and $2^\mu N_{symb}^{(\mu)}$ OFDM symbols Herein, $N_{RB}^\mu \leq N_{RB}^{max,\mu}$. The above $N_{RB}^{max,\mu}$ indicates the maximum transmission bandwidth, and it may change not just between numerologies, but between UL and DL.

In this case, as illustrated in FIG. 3, one resource grid may be configured for the numerology $\mu$ and an antenna port p.

Each element of the resource grid for the numerology $\mu$ and the antenna port p is indicated as a resource element, and may be uniquely identified by an index pair (k,l̄) Herein,

TABLE 2

| | Slot configuration | | | | | |
|---|---|---|---|---|---|---|
| | 0 | | | 1 | | |
| $\mu$ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| $\mu$ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

$k=0, \ldots, N_{RB}^\mu N_{sc}^{RB}-1$ is an index in the frequency domain, and $\bar{l}=0, \ldots, 2^\mu N_{symb}^{(\mu)}-1$ indicates a location of a symbol in a subframe. To indicate a resource element in a slot, the index pair (k,l) is used. Herein, $l=0, \ldots, N_{symb}^\mu-1$.

The resource element (k,l̄) for the numerology $\mu$ and the antenna port p corresponds to a complex value $a_{k,\bar{l}}^{(p,\mu)}$. When there is no risk of confusion or when a specific antenna port or numerology is specified, the indexes p and µ may be dropped and thereby the complex value may become $\alpha_{k,j}^{(p)}$ or $\alpha_{k,j}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \qquad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Self-Contained Subframe Structure

Figure 4:
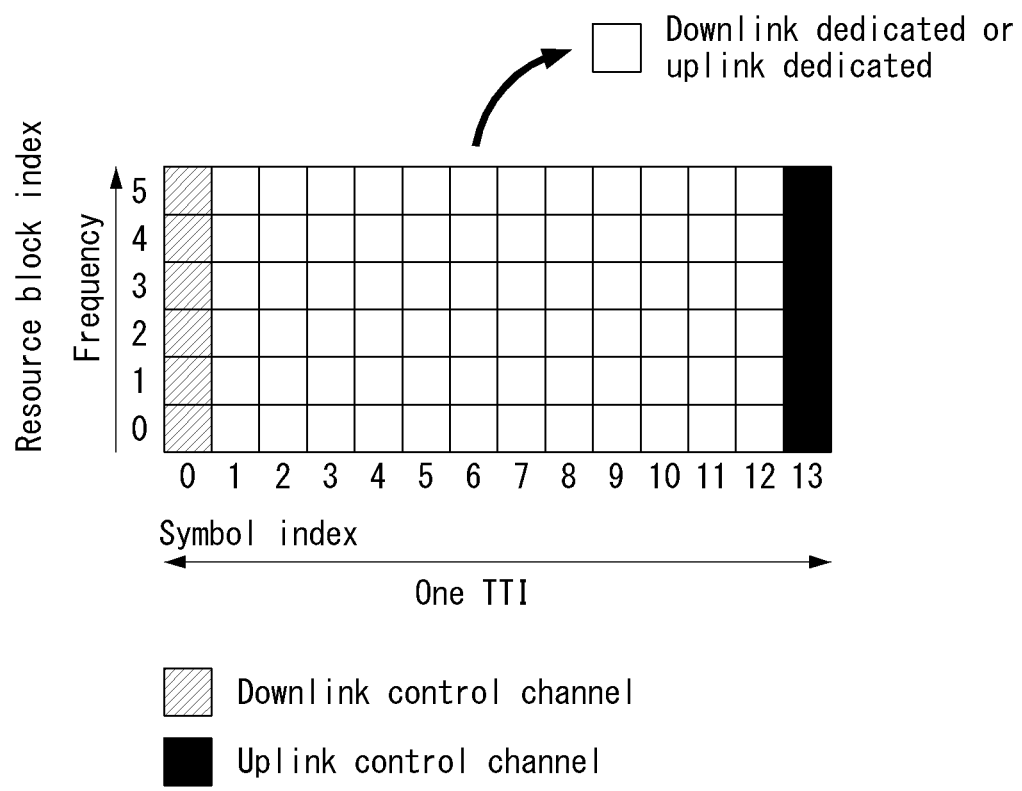
FIG. 4 is a diagram illustrating a self-contained subframe structure in the wireless communication system to which the method proposed in the present specification may be applied.

FIG. 4 is a diagram illustrating an example of a self-contained subframe structure in a wireless communication system to which the present disclosure may be implemented.

In order to minimize data transmission latency in a TDD system, 5G new RAT considers a self-contained subframe structure as shown in FIG. 4.

In FIG. 4, a diagonal line area (symbol index 0) represents a UL control area, and a black area (symbol index 13) represents a UL control area. A non0shade area may be used for DL data transmission or for UL data transmission. This structure is characterized in that DL transmission and UL transmission are performed sequentially in one subframe and therefore transmission of DL data and reception of UL ACK./NACK may be performed in the subframe. In conclusion, it is possible to reduce time for retransmitting data upon occurrence of a data transmission error and thereby minimize a latency of final data transmission.

In this self-contained subframe structure, a time gap is necessary for a base station or a UE to switch from a transmission mode to a reception mode or to switch from the reception mode to the transmission mode. To this end, some OFDM symbols at a point in time of switching from DL to UL in the self-contained subframe structure are configured as a guard period (GP).

Analog Beamforming

Since a wavelength is short in a Millimeter Wave (mmW) range, a plurality of antenna elements may be installed in the same size of area. That is, a wavelength in the frequency band 30 GHz is 1 cm, and thus, 64 (8×8) antenna elements may be installed in two-dimensional arrangement with a 0.5 lambda (that is, a wavelength) in 4×4 (4 by 4) cm panel. Therefore, in the mmW range, the coverage may be enhanced or a throughput may be increased by increasing a beamforming (BF) gain with a plurality of antenna elements.

In this case, in order to enable adjusting transmission power and phase for each antenna element, if a transceiver unit (TXRU) is included, independent beamforming for each frequency resource is possible. However, it is not cost-efficient to install TXRU at each of about 100 antenna elements. Thus, a method is considered in which a plurality of antenna elements is mapped to one TXRU and a direction of beam is adjusted with an analog phase shifter. Such an analog BF method is able to make only one beam direction over the entire frequency band, and there is a disadvantage that frequency-selective BF is not allowed.

A hybrid BF may be considered which is an intermediate between digital BF and analog BF, and which has B number of TXRU less than Q number of antenna elements. In this case, although varying depending upon a method of connecting B number of TXRU and Q number of antenna elements, beam directions capable of being transmitted at the same time is restricted to be less than B.

Hereinafter, typical examples of a method of connecting TXRU and antenna elements will be described with reference to drawings.

FIG. 5 is an example of a transceiver unit model in a wireless communication system to which the present disclosure may be implemented.

A TXRU virtualization model represents a relationship between output signals from TXRUs and output signals from antenna elements. Depending on a relationship between antenna elements and TXRUs, the TXRU virtualization model may be classified as a TXRU virtualization model option-1: sub-array partition model, as shown in FIG. 5(a), or as a TXRU virtualization model option-2: full-connection model.

Referring to FIG. 5(a), in the sub-array partition model, the antenna elements are divided into multiple antenna element groups, and each TXRU may be connected to one of the multiple antenna element groups. In this case, the antenna elements are connected to only one TXRU.

Referring to FIG. 5(b), in the full-connection model, signals from multiple TXRUs are combined and transmitted to a single antenna element (or arrangement of antenna elements). That is, this shows a method in which a TXRU is connected to all antenna elements. In this case, the antenna elements are connected to all the TXRUs.

In FIG. 5, q represents a transmitted signal vector of antenna elements having M number of co-polarized in one column. W represents a wideband TXRU virtualization weight vector, and W represents a phase vector to be multiplied by an analog phase shifter. That is, a direction of analog beamforming is decided by W. x represents a signal vector of M_TXRU number of TXRUs.

Herein, mapping of the antenna ports and TXRUs may be performed on the basis of 1-to-1 or 1-to-many.

TXRU-to-element mapping In FIG. 5 is merely an example, and the present disclosure is not limited thereto and may be equivalently applied even to mapping of TXRUs and antenna elements which can be implemented in a variety of hardware forms.

Further, in a New RAT system, when multiple antennas are used, a hybrid beam forming technique combining digital beam forming and analog beam forming is emerging. In this case, the analog beamforming (or radio frequency (RF) beamforming) means an operation of performing precoding (or combining) in an RF stage. In the hybrid beamforming, each of a baseband stage and the RF stage perform precoding (or combining), thereby reducing the number of RF chains and the number of digital (D)/analog (A) converters and achieving performance close to the digital beamforming. For convenience, the hybrid beamforming structure may be represented by N transceiver units (TXRU) and M physical antennas. Then, the digital beamforming for L data layers to be transmitted by the transmitter may be represented by an N by L matrix, and then the N digital signals converted are converted into an analog signal via the TXRU and then applied the analog beamforming represented by an M by N matrix.

Figure 6:
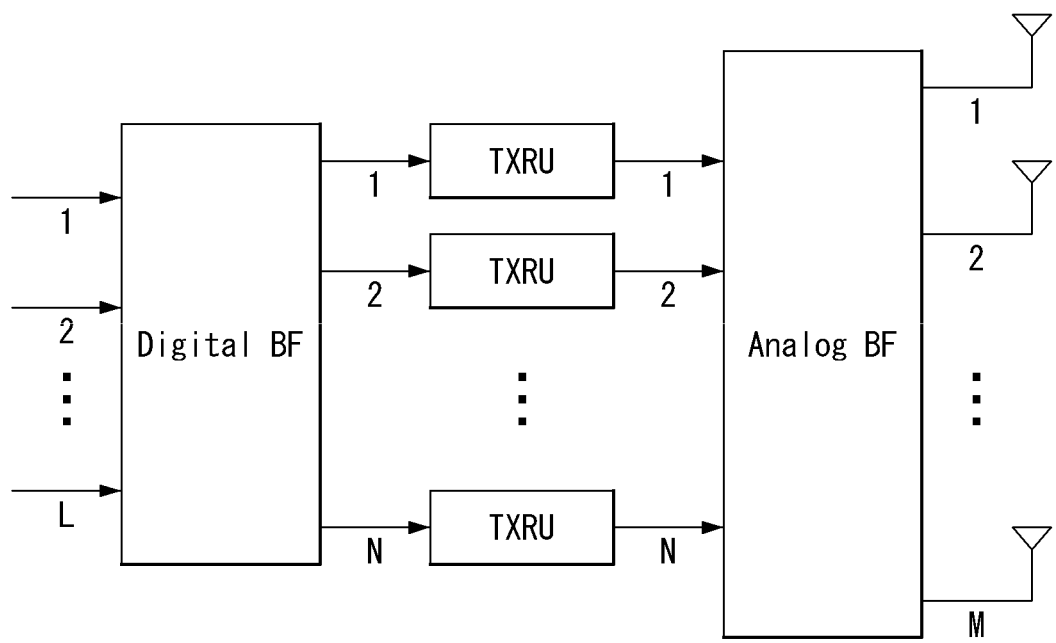
FIG. 6 is a diagram illustrating a hybrid beamforming structure in terms of TXRU and a physical antenna in the wireless communication system to which the method proposed in the present specification may be applied.

FIG. 6 is a diagram illustrating a hybrid beamforming structure in terms of TXRU and a physical antenna in the wireless communication system to which the method proposed in the present specification may be applied.

In FIG. 6, a case where the number of digital beams is L and the number of analog beams is N is illustrated.

In the New RAT system, considered is a direction in which it is designed so that the BS may change the analog beamforming by the unit of the symbol to support more efficient beamforming to a UE positioned in a specific region. Furthermore, in FIG. 6, when N specific TXRUs and M specific RF antennas are defined as one antenna panel, a scheme that introduces a plurality of antenna panels capable of independent hybrid beamforming is also considered in the New RAT system.

Feedback of Channel State Information (CSI)

In a 3GPP LTE/LTE-A system, user equipment (UE) is defined to report channel state information (CSI) to a base station (BS or eNB).

The CSI collectively refers to information that can indicate the quality of a radio channel (or referred to as a link) formed between the UE and the antenna port. For example, a rank indicator (RI), a precoding matrix indicator (PMI), a channel quality indicator (CQI), and the like correspond to the information.

Here, the RI represents rank information of a channel, which means the number of streams received by the UE through the same time-frequency resource. Since this value is determined depending on the long term fading of the channel, the value is fed back from the UE to the BS with a period usually longer than the PMI and the CQI. The PMI is a value reflecting a channel space characteristic and represents a preferred precoding index preferred by the UE based on a metric such as signal-to-interference-plus-noise ratio (SINR). The CQI is a value representing the strength of the channel, and generally refers to a reception SINR that can be obtained when the BS uses the PMI.

In the 3GPP LTE/LTE-A system, the BS configures a plurality of CSI processes to the UE and may receive CSI for each process. Here, the CSI process is constituted by a CSI-RS for signal quality measurement from the BS and a CSI-interference measurement (CSI-IM) resource for interference measurement.

Virtualization of Reference Signal (RS)

In the mmW, it is possible to transmit a PDSCH only in one analog beam direction at a time by analog beamforming. In this case, data transmission from the BS is possible only to a small number of UEs in the corresponding direction. Therefore, if necessary, the analog beam direction is differently configured for each antenna port so that data transmission can be simultaneously performed to a plurality of UEs in several analog beam directions.

Figure 7:
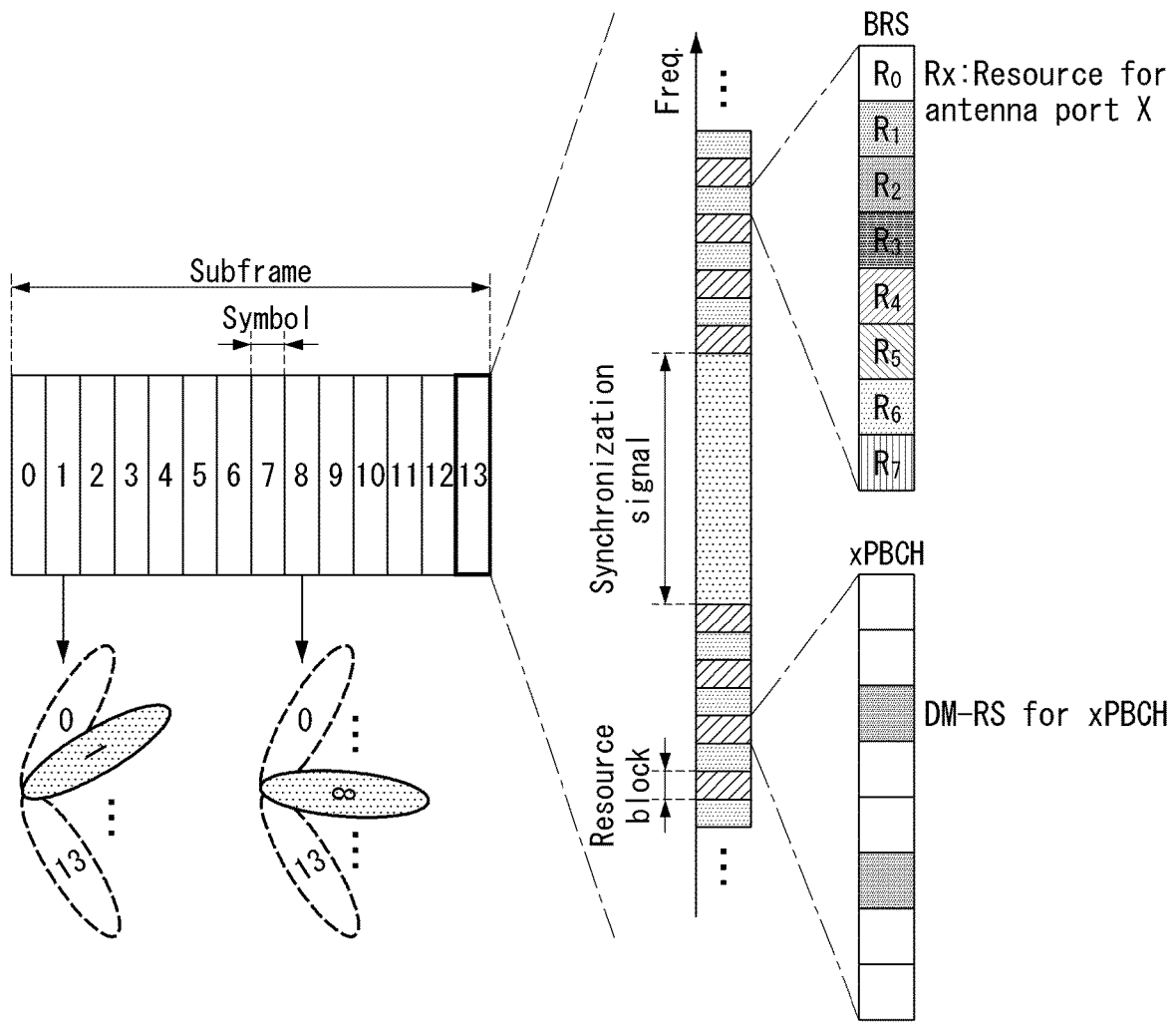
FIG. 7 is a diagram illustrating an example of a beam sweeping operation to which the method proposed in the present specification may be applied.

FIG. 7 is a diagram illustrating an example of a beam sweeping operation to which the method proposed in the present specification may be applied.

As described in FIG. 6, when the BS uses a plurality of analog beams, a beam sweeping operation is considered, which allows all UEs to have a reception opportunity by changing a plurality of analog beams to which the BS intends to apply in a specific subframe according to the symbol at least with respect to a synchronization signal, system information, and a paging signal because an analog beam which is advantageous for signal reception for each UE.

FIG. 7 illustrates an example of a beam sweeping operation for a synchronization signal and system information in a downlink transmission process. In FIG. 7, a physical resource (or physical channel) through which the system information is transmitted in a broadcasting scheme in the New RAT is referred to as physical broadcast channel (xPBCH).

In this case, analog beams belonging to different antenna panels within one symbol may be simultaneously transmitted and discussed is a scheme that introduces a beam reference signal (BRS) which is a reference signal transmitted, to which a single analog beam (corresponding to a specific antenna panel) is applied as illustrated in FIG. 7 to measure channels depending on the analog beam.

The BRS may be defined for a plurality of antenna ports and each antenna port of the BRS may correspond to the single analog beam.

In this case, unlike the BRS, the synchronization signal or xPBCH may be transmitted, to which all of the analog beams in the analog beam group are applied so that the signal may be well received by random UEs.

RRM Measurement

The LTE system supports RRM operations including power control, scheduling, cell search, cell reselection, handover, radio link or connection monitoring, connection establishment/re-establishment, and the like.

In this case, the serving cell may request RRM measurement information, which is a measurement value for performing the RRM operations, to the UE.

For example, the UE may measure information including cell search information for each cell, reference signal received power (RSRP), reference signal received quality (RSRQ), and the like and report the measured information to the BS.

Specifically, in the LTE system, the UE receives 'measConfig' as a higher layer signal for RRM measurement from the serving cell. The UE measures the RSRP or RSRQ according to 'measConfig'.

The RSRP, the RSRQ, and the RSSI are defined as below.
  RSRP: The RSRP may be defined as a linear average of a power contribution [W] of a resource element carrying a cell specific reference signal within a considered measurement frequency bandwidth. A cell specific reference signal R0 may be used for deciding the RSRP. When the UE may reliably detect that R1 is available, the UE may decide the RSRP by using R1 in addition to R0.

A reference point of the RSRP may be an antenna connector of the UE.

When receiver diversity is used by the UE, a reported value need not be smaller than the RSRP corresponding to a random individual diversity branch.
  RSRQ: The reference signal received quality (RSRQ) is defined as a ratio N×RSRP/(E-UTRA carrier RSSI) and N represents the number of RBs of an E-UTRA carrier RSSI measurement bandwidth. Measurements of numerator and denominator should be performed through the same set of resource blocks.

The E-UTRA carrier received signal strength indicator (RSSI) is received through a block by the UE from all sources including N resource adjacent channel interference, thermal noise, etc., in a linear average of the total received power [W] measured only in an OFDM symbol containing a reference symbol for antenna port 0 and a measurement bandwidth.

When the higher layer signaling represents a specific subframe for performing the RSRQ measurement, the RSSI is measured for all OFDM symbols in the indicated subframe.

The reference point for THE RSRQ should be the antenna connector of the UE.

When the receiver diversity is used by the UE, the reported value should not be smaller than the corresponding RSRQ of the random individual diversity branch.

RSSI: The RSSI means received broadband power including thermal noise and noise generated at the receiver within a bandwidth defined by a receiver pulse shaping filter.

The reference point for measuring the RSSI should be the antenna connector of the UE. When the receiver diversity is used by the UE, the reported value should not be smaller than the corresponding UTRA carrier RSSI of the random individual receive antenna branch.

According to such a definition, the UE which operates in the LTE system may be allowed to measure the RSRP in a bandwidth corresponding to one of 6, 15, 25, 50, 75, and 100 resource blocks (RBs) through an information element (IE) related with an allowed measurement bandwidth transmitted system information block type 3 (SIB3) in the case of intra-frequency measurement and through an allowed measurement bandwidth transmitted in SIB5 in the case of inter-frequency measurement.

Alternatively, in the absence of such an IE, the measurement may be performed in a frequency band of the entire downlink (DL) system by default. In this case, when the UE receives the allowed measurement bandwidth, the UE may consider the corresponding value as a maximum measurement bandwidth and arbitrarily measure the value of the RSRP within the corresponding value.

However, when the serving cell transmits an IE defined as WB-RSRQ and the allowed measurement bandwidth is set to 50 RB or more, the UE needs to calculate the RSRP value for the entire allowed measurement bandwidth. Meanwhile, the RSSI may be measured in the frequency band of the receiver of the UE according to the definition of the RSSI bandwidth.

Figure 8:
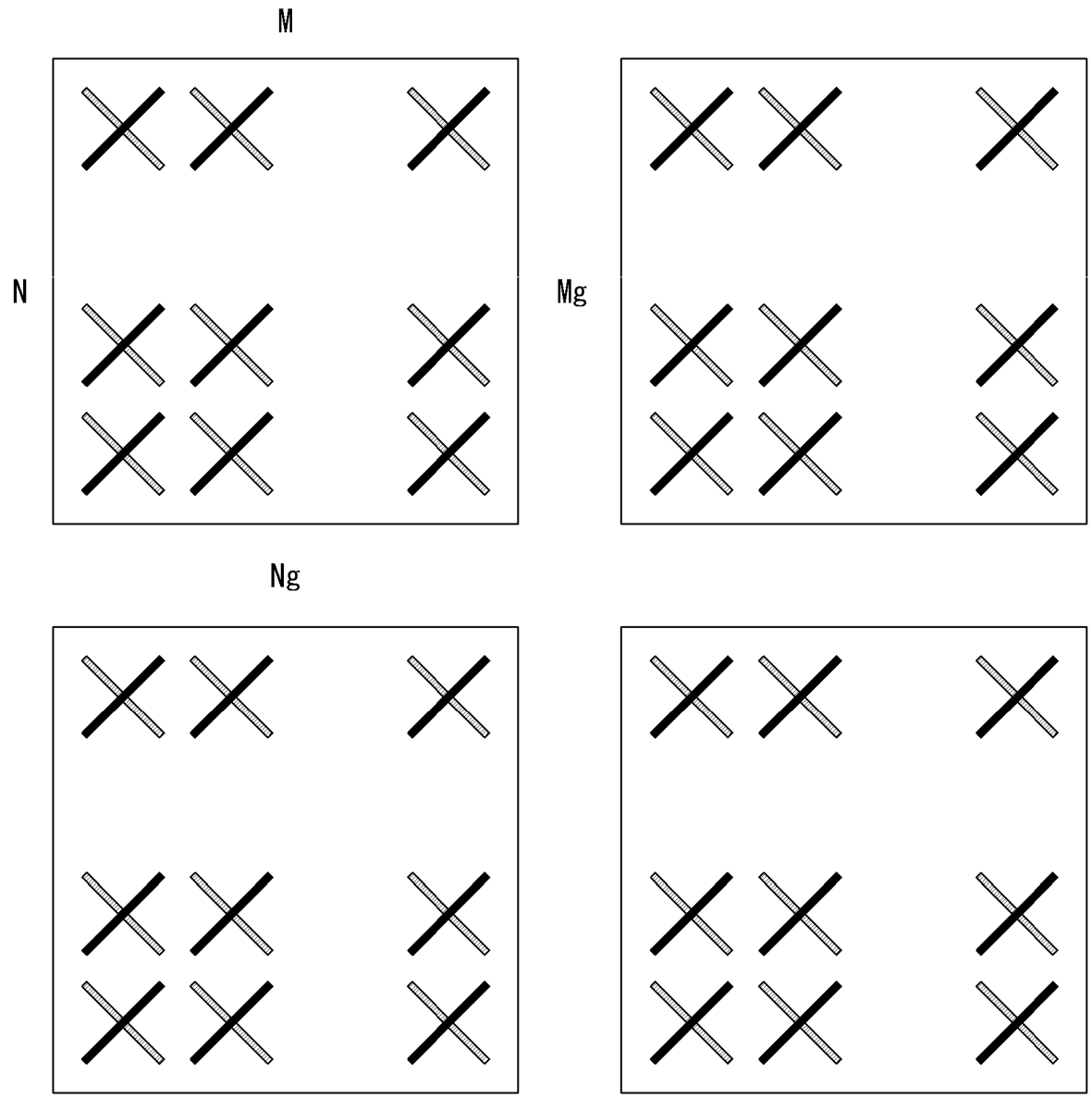
FIG. 8 is a diagram illustrating an example of an antenna array to which the method proposed in the present specification may be applied.

FIG. 8 is a diagram illustrating an example of an antenna array to which the method proposed in the present specification may be applied.

Referring to FIG. 8, the normalized panel antenna array may be constituted by Mg panels and Ng panels in a horizontal domain and a vertical domain, respectively.

In this case, one panel is constituted by M columns and N rows, respectively, and an X-pol antenna is assumed in FIG. 8. Therefore, the total number of antenna elements may be 2*M*N*Mg*Ng.

Channel State Information (CSI) Related Procedure

Figure 9:
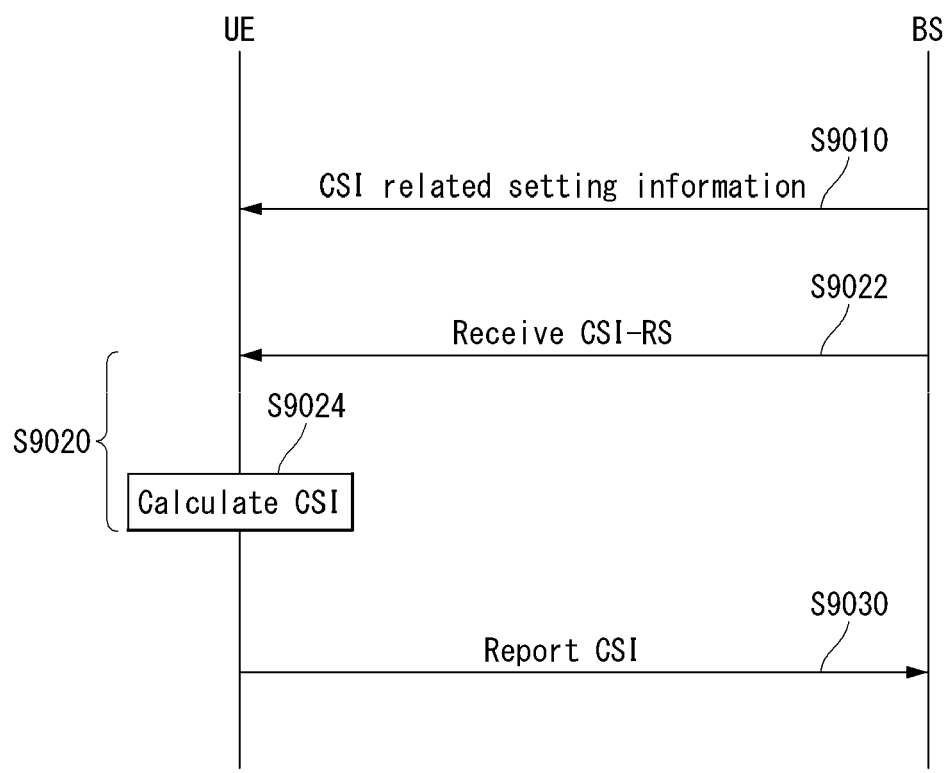
FIG. 9 is a flowchart illustrating an example of a CSI related procedure to which the method proposed in the present specification may be applied.

FIG. 9 is a flowchart illustrating an example of a CSI related procedure to which the method proposed in the present specification may be applied.

In the new radio (NR) system, a channel state information-reference signal (CSI-RS) is used for time/frequency tracking, CSI computation, layer 1(L1)-reference signal received power (RSRP) computation, or mobility Throughout the present disclosure, "A and/or B" may be interpreted as the same as "including at least one of A or B".

The CSI computation is related to CSI acquisition, and L1-RSRP computation is related to beam management (BM).

The CSI indicates all types of information indicative of a quality of a radio channel (or link) formed between a UE and an antenna port.

To perform one of the above purposes of a CSI-RS, a terminal (e.g., a UE) receives CSI related configuration information from a base station (e.g., a general node B (gNB)) through a radio resource control (RRC) signaling (S9010).

The CSI-related configuration information may include at least one of CSI interference management (IM) resource-related information, CSI measurement configuration-related information, CSI resource configuration-related information, CSI-RS resource-related information, or CSI report configuration-related information.

The CSIIM resource-related information may include CSI-IM resource information, CSI-IM resource set information, etc.

The CSI-IM resource set is identified by a CSI-IM resource set ID (identifier), and one resource set includes at least one CSI-IM resource.

Each CSI-IM resource is identified by a CSI-IM resource ID.

The CSI resource configuration-related information defines a group including at least one of a non-zero power (NZP) CSI-RS resource set, a CSI-IM resource set, or a CSI-SSB resource set.

That is, the CSI resource configuration-related information includes a CSI-RS resource set list, and the CSI-RS resource set list may include at least one of a NZP CSI-RS resource set list, a CSI-IM resource set list, or a CSI-SSB resource set list.

The CSI resource configuration-related information may be expressed as CSI-REsourceConfig IE.

The CSI-RS resource set is identified by a CSI-RS resource set ID, and one resource set includes at least one CSI-RS resource.

Each CSI-RS resource is identified by a CSI-RS resource ID.

As shown in Table 4, parameters (e.g.: the BM-related parameter repetition, and the tracking-related parameter trs-Info indicative of (or indicating) a purpose of a CSI-RS may be set for each NZP CSI-RS resource set.

Table 4 shows an example of NZP CSI-RS resource set IE.

TABLE 4

```
-- ASN1START
-- TAG-NZP-CSI-RS-RESOURCESET-START
NZP-CSI-RS-ResourceSet ::=            SEQUENCE {
    nzp-CSI-ResourceSetId             NZP-CSI-RS-ResourceSetId,
    nzp-CSI-RS-Resources              SEQUENCE (SIZE (1..maxNrofNZP-
CSI-RS-ResourcesPerSet)) OF NZP-CSI-RS-ResourceId,
    repetition                        ENUMERATED { on, off }
    aperiodicTriggeringOffset         INTEGER(0..4)
    trs-Info                          ENUMERATED {true}
    ...
}
-- TAG-NZP-CSI-RS-RESOURCESET-STOP
-- ASN1STOP
```

In Table 4, the parameter repetition is a parameter indicative of whether to repeatedly transmit the same beam, and indicates whether repetition is set to "ON" or "OFF" for each NZP CSI-RS resource set.

The term "transmission (Tx) beam" used in the present disclosure may be interpreted as the same as a spatial domain transmission filter, and the term "reception (Rx) beam" used in the present disclosure may be interpreted as the same as a spatial domain reception filter.

For example, when the parameter repetition in Table 4 is set to "OFF", a UE does not assume that a NZP CSI-RS resource(s) in a resource set is transmitted to the same DL spatial domain transmission filter and the same Nrofports in all symbols.

In addition, the parameter repetition corresponding to a higher layer parameter corresponds to "CSI-RS-ResourceRep" of L1 parameter.

The CSI report configuration related information includes the parameter reportConfigType indicative of a time domain behavior and the parameter reportQuantity indicative of a CSI-related quantity to be reported.

The time domain behavior may be periodic, aperiodic, or semi-persistent.

In addition, the CSI report configuration-related information may be represented as CSI-ReportConfig IE, and Table 5 shows an example of the CSI-ReportConfig IE.

TABLE 5

```
-- ASN1START
-- TAG-CSI-RESOURCECONFIG-START
CSI-ReportConfig ::=                    SEQUENCE {
    reportConfigId                          CSI-ReportConfigId,
    carrier                                 ServCellIndex
OPTIONAL, -- Need S
    resourcesForChannelMeasurement          CSI-ResourceConfigId,
    csi-IM-ResourcesForInterference         CSI-ResourceConfigId
OPTIONAL, -- Need R
    nzp-CSI-RS-ResourcesForInterference     CSI-ResourceConfigId
OPTIONAL,      -- Need R
    reportConfigType                        CHOICE {
        periodic                                SEQUENCE {
            reportSlotConfig                        CSI-
ReportPeriodicityAndOffset,
            pucch-CSI-ResourceList                  SEQUENCE (SIZE
(1..maxNrofBWPs)) OF PUCCH-CSI-Resource
        },
        semiPersistentOnPUCCH                   SEQUENCE {
            reportSlotConfig                        CSI-
ReportPeriodicityAndOffset,
            pucch-CSI-ResourceList                  SEQUENCE (SIZE
(1..maxNrofBWPs)) OF PUCCH-CSI-Resource
        },
        semiPersistentOnPUSCH                   SEQUENCE {
            reportSlotConfig                        ENUMERATED {s15, s110,
s120, s140, s180, s1160, s1320},
            reportSlotOffsetList                    SEQUENCE (SIZE (1..
maxNrofUL-Allocations)) OF INTEGER(0..32),
            p0alpha                                 P0-PUSCH-AlphaSetId
        },
        aperiodic                               SEQUENCE {
            reportSlotOffsetList                    SEQUENCE (SIZE
(1..maxNrofUL-Allocations)) OF INTEGER(0..32)
        }
    },
    reportQuantity                          CHOICE {
        none                                    NULL,
        cri-RI-PMI-CQI                          NULL,
        cri-RI-i1                               NULL,
        cri-RI-i1-CQI                           SEQUENCE {
            pdsch-BundleSizeForCSI                  ENUMERATED {n2, n4}
OPTIONAL
        },
        cri-RI-CQI                              NULL,
        cri-RSRP                                NULL,
        ssb-Index-RSRP                          NULL,
        cri-RI-LI-PMI-CQI                       NULL
    },
```

In addition, the UE measures CSI based on configuration information related to the CSI (S9020).

Measuring the CSI may include (1) receiving a CSI-RS by the UE (S9022) and (2) computing CSI based on the received CSI-RS (S9024).

A sequence for the CSI-RS is generated by Equation 2, and an initialization value of a pseudo-random sequence C(i) is defined by Equation 3.

$$r(m) = \frac{1}{\sqrt{2}}(1 - 2 \cdot c(2m)) + j\frac{1}{\sqrt{2}}(1 - 2 \cdot c(2m+1)) \quad \text{[Equation 2]}$$

$$c_{init} = (2^{10}(N_{symb}^{slot} n_{s,f}^{\mu} + l + 1)(2n_{ID} + 1) + n_{ID}) \bmod 2^{31} \quad \text{[Equation 3]}$$

In Equations 2 and 3, $n_{s,f}^{\mu}$ is a slot number within a radio frame, and a pseudo-random sequence generator is initialized with Cint at the start of each OFDM symbol where $n_{s,f}^{\mu}$ is the slot number within a radio frame.

In addition, l indicates an OFDM symbol number in a slot, and $n_{ID}$ indicates higher-layer parameter scramblingID.

In addition, regarding the CSI-RS, resource element (RE) mapping of CSI-RS resources of the CSI-RS is performed in time and frequency domains by higher layer parameter CSI-RS-ResourceMapping.

Table 6 shows an example of CSI-RS-ResourceMapping IE.

To put it briefly, when repetition is set to "ON" and "OFF", a CSI report may indicate any one of "No report", "SSB Resource Indicator (SSBRI) and L-RSRP", and "CSI-RS Resource Indicator (CRI) and L1-RSRP".

Alternatively, it may be defined to transmit a CSI report indicative of "SSBRI and L1-RSRP" or "CRI and L1-RSRP" when repetition is set to "OFF", it may be defined such that, and to transmit a CSI report indicative of "No report", "SSBRI and L1-RSRP", or "CRI and L1-RSRP" when repetition is "ON".

Hereinafter, a feedback content for CSI reporting will be described.

A configuration scheme of a downlink codebook may include a codebook configuration scheme corresponding to a single panel and multi panels constituting downlink CSI feedback type 1 and a codebook linear combination based configuration scheme for type 2.

When the CSI and the like are reported using such a codebook, the CSI may be configured as follows.

Elements constituting the CSI may include a CSI-RS resource indicator (CRI), a rank indicator (RI), a channel quality indicator (CQI), and a precoding matrix indicator (PMI).

In the case of the CRI, each resource may be configured/applied with specific analog and/or digital beamforming. In the case of the RI, the maximum number of ranks which may be reported may be decided according to a reception antenna

TABLE 6

```
-- ASN1START
-- TAG-CSI-RS-RESOURCEMAPPING-START
CSI-RS-ResourceMapping ::=          SEQUENCE {
    frequencyDomainAllocation       CHOICE {
        row1                        BIT STRING (SIZE (4)),
        row2                        BIT STRING (SIZE (12)),
        row4                        BIT STRING (SIZE (3)),
        other BIT STRING (SIZE (6))
    },
    nrofPorts                       ENUMERATED
{p1,p2,p4,p8,p12,p16,p24,p32},
    firstOFDMSymbolInTimeDomain         INTEGER (0..13),
    firstOFDMSymbolInTimeDomain2    INTEGER (2..12)
    cdm-Type                        ENUMERATED {noCDM, fd-CDM2, cdm4-
FD2-TD2, cdm8-FD2-TD4},
    density                         CHOICE {
        dot5                        ENUMERATED {evenPRBs, oddPRBs},
        one                         NULL,
        three                       NULL,
        spare                       NULL
    },
    freqBand                        CSI-FrequencyOccupation,
    ...
}
```

In Table 6, a density (D) indicates a density of CSI-RS resources measured in a RE/port/physical resource block (PRB), and nrofPorts indicates the number of antenna ports.

In addition, the UE reports the measured CSI to the base station (S630).

Herein, when a quantity of CSI-ReportConfig in Table 6 is set to "none(or No report)", the UE may skip the reporting.

However, even when the quantity is set to "none(or No report)", the UE may report the measured CSI to the base station.

The case where the quantity is set to "none" is t when an aperiodic TRS is triggered or when repetition is set.

Herein, it may be defined such that reporting by the UE is omitted only when repetition is set to "ON".

of the UE, which the UE reports to the BS according to a capability. That is, when the RI is less than or equal to N_RX, a bit field of the RI may be decided accordingly.

For example, it may be reported that when the N_Rx is '2', the bit of RI is set to 1 bit, when the N_Rx is '4', the bit of the RI is set to 2 bits, and when the N_Rx is '8', the bit of the RI is set to 3 bits.

Further, for purposes of TRP or panel-to-panel NC-JT, a value of '0' may be reported as RI for TRP/Panel purposes not used for TRP/panel selection purposes.

The PMI is a PMI calculated by using codebooks represented as Type I and Type II and the UE may calculate a PMI which is most preferred/best companion (or worst) on the codebook and report the calculated PMI to the BS and the PMI may become a wideband, sub-band, or partial band (PB) PMI according to reported frequency granularity or expressed as a long-term/short-term PMI according to a reporting cycle.

The CQI is calculated by the UE based on metrics including an SINR calculated using the RS such as the CSI-RS and the codebook and reported to the BS using a CQI table.

CRI

The CRI may be used as a representative value of a Tx Beam index for a single purpose of beam management. In this case, the number 'M' of all Tx beams may be decided by the number 'Na' of antenna constants participating in the TXRU virtualization of the BS and an oversampling value 'Oa' of the analog beam (for example, M=Na Oa).

Each parameter may be informed to the UE through higher layer signaling or preconfigured.

Alternatively, the BS may configure the number of analog Tx beams in the UE or may be promised between the BS and the UE and in this case, a size of max CIR as $\lceil \log_2 M \rceil$ may be configured/applied in the UE.

In this case, the CRI for beam management may be reported to the BS alone.

CRI+BGI

CRI and beam group index (BGI): In the case of the BGI as an indicator for an RX analog beam group, a Tx beam group corresponding to (alternatively, subjected to spatial QCLed) the Tx beam may be configured by being grouped by a predetermined metric (for example, RXRP, RSRQ, or SINR) or configured for each panel provided in the UE.

Alternatively, the CRI and the BGI may be separately encoded and reported to the BS or may be encoded together and reported to the BS to reduce the overhead of the payload size.

i. CRI+BGI+RSRPI(or CQI)

When the CGI and the BGI are together reported to the BS, an RSRP indicator (RSRPI) may be reported in order to indicate information on RSRP corresponding to the TX beam or a Tx-Rx beam pair in addition to the CIR and the BGI.

In this case, each indicator may be encoded separately or may be encoded together and reported to the BS to reduce the overhead of the payload size.

In order to report the RSRPI together with the CIR and the BGI, a table for the RSRP may be defined separately or the CQI table may be used.

In this case, the UE may calculate the wideband CQI by ignoring the interference or calculate the wideband CQI using the one-shot measurement of the interference and even when the number of ports set for beam management is greater than 1, Rank 1 restriction may be proposed.

This has an advantage of being able to perform fast CQI acquisition.

The BS may inform the UE whether the RSRPI or the CQI is used through the higher layer signaling.

CRI+RSRPI (or CQI)

Similar to a scheme of A-I described above, the UE may report the CRI and RSRPI (or CQI) to the BS together without reporting the BGI.

CRI+PMI

When multiple ports are configured in the CRI and each of the analog beams is configured for each port, the UE needs to separately report information on the ports in each CRI in order to report the preferred Tx beam to the BS.

In this case, a PMI such as a port selection codebook is applied for a port indication and has a wideband nature.

Further, the CRI and PMI may be separately encoded or in the case of a port configuration other than a power of 2, as in the case of 12-port and 24-port, the CRI and the PMI may be encoded together in order to reduce the payload size.

Further, even in such a scheme, there may be a reporting type (e.g., a type CRI, PMI, and RSRPI (or CQI) are separately encoded or together encoded) extensively combined with A and B. Alternatively, when the number of ports used for beam management is set to X ports or less (for example, X=8, configurable), the RI may be extensively applied as the indicator of each port to be used for reporting the CRI and the RI without considering a type in which the CRI and the PMI are additionally encoded.

The CRI may be used mainly for beam management, and a single beam management CSI set {CRI, BGI, RSRPI (or CQI), PMI} corresponding to the best preferred analog beam (set) may be reported to the BS by the UE.

Multiple analog beams may be configured/applied to be reported for a purpose such as a CoMP operation, a purpose (best and worst) of interference control, or beam discovery.

In this case, the number of BM CSI sets (alternatively, BM CSI subsets), BS CSI reporting type (e.g., CSI configured by the BM CSI subset) and corresponding to A, B, and C described above), and BM CSI reporting mode to be reported in the CSI resource configuration may be configured/applied to be individually or integrally applied according to the CSI procedure.

In the case of PUCCH-based reporting, the number of BM CSI configurations to be reported to the same instance in the resource configuration may be set according to the size of the PUCCH container and multiple BM CSI sets which are configured may be reported at once (hereinafter referred to as mode 1) or multiple BM CSI sets which are configured may be reported with the same period/different offsets (mode 2).

In this case, the best BM CSI set has a higher priority than other BM CSI sets. The following is an example of a periodic transmission mode of multiple BM CSI sets or BM CSI subsets and for convenience of description, the following is written only as the BM CSI set and may be referred to as the BM CSI subset.

Mode 1)

1st instance: BM CSI set_1+BM CSI set_2+ . . . . BM CSI set_1_K (K is configurable)

Mode 2)

1st instance (w/offset 0): BM CSI set_1

1st instance (w/offset 1): BM CSI set_2

. . .

1st instance (w/offset K-1): BM CSI set_1_K (K is configurable)

CRI based CSI reporting described above may be used not only for BM but also for CSI acquisition like LTE Class B. This may be configured according to CSI process in CSI resource setting or informed to the UE through separate RRC signaling.

Type I PMI

For Type I in the NR downlink codebook, the codebook payload may be represented as in Table 7 below.

TABLE 7

|  | x |  | 2 | | 4 | | 8 (1D) | | 8 (2D) | | 12 (1D) | | 12 (2D) | | 16 (1D) | |
|---|---|---|---|---|---|---|---|---|---|---|---|---|---|---|---|---|
|  |  |  | W1 | W2 | W1 | W2 | W1 | W2 | W1 | W2 | W1 | W2 | W1 | W2 | W1 | W2 |
| rank | 1 | Config 1 | 2 | | 3 | 2 | 4 | 2 | 6 | 2 | 5 | 2 | 7 | 2 | 5 | 2 |
|  |  | Config 2 |  | | 2 | 4 | 3 | 4 | 4 | 4 | 4 | 4 | 5 | 4 | 4 | 4 |
|  | 2 | Config 1 | 1 | | 4 | 1 | 6 | 1 | 8 | 1 | 7 | 1 | 9 | 1 | 7 | 1 |
|  |  | Config 2 |  | | 3 | 3 | 5 | 3 | 6 | 3 | 6 | 3 | 7 | 3 | 6 | 3 |
|  | 3 |  |  | | 3 | 1 | 6 | 1 | 8 | 1 | 7 | 1 | 9 | 1 | 6 | 1 |
|  | 4 |  |  | | 3 | 1 | 6 | 1 | 8 | 1 | 7 | 1 | 9 | 1 | 6 | 1 |
|  | 5 |  |  | |  |  | 4 | 1 | 6 | 1 | 5 | 1 | 7 | 1 | 5 | 1 |
|  | 6 |  |  | |  |  | 4 | 1 | 6 | 1 | 5 | 1 | 7 | 1 | 5 | 1 |
|  | 7 |  |  | |  |  | 3 | 1 | 6 | 1 | 5 | 1 | 6 | 1 | 5 | 1 |
|  |  | N2 = 2 |  | |  |  |  |  |  |  |  |  |  |  |  |  |
|  | 8 |  |  | |  |  | 3 | 1 | 6 | 1 | 5 | 1 | 6 | 1 | 5 | 1 |

|  | x |  | 16 (2D) | | 24 (1D) | | 24 (2D) | | 32 (1D) | | 32 (2D) | |
|---|---|---|---|---|---|---|---|---|---|---|---|---|
|  |  |  | W1 | W2 | W1 | W2 | W1 | W2 | W1 | W2 | W1 | W2 |
| rank | 1 | Config 1 | 7 | 2 | 6 | 2 | 8 | 2 | 6 | 2 | 8 | 2 |
|  |  | Config 2 | 5 | 4 | 5 | 4 | 6 | 4 | 5 | 4 | 6 | 4 |
|  | 2 | Config 1 | 9 | 1 | 8 | 1 | 10 | 1 | 8 | 1 | 10 | 1 |
|  |  | Config 2 | 7 | 3 | 7 | 3 | 8 | 3 | 7 | 3 | 8 | 3 |
|  | 3 |  | 8 | 1 | 7 | 1 | 9 | 1 | 7 | 1 | 9 | 1 |
|  | 4 |  | 8 | 1 | 7 | 1 | 9 | 1 | 7 | 1 | 9 | 1 |
|  | 5 |  | 7 | 1 | 6 | 1 | 8 | 1 | 6 | 1 | 8 | 1 |
|  | 6 |  | 7 | 1 | 6 | 1 | 8 | 1 | 6 | 1 | 8 | 1 |
|  | 7 |  | 6 | 1 | 6 | 1 | 8 | 1 | 6 | 1 | 8 | 1 |
|  |  | N2 = 2 |  |  |  |  | 7 |  |  |  | 7 |  |
|  | 8 |  | 6 | 1 | 6 | 1 | 8 | 1 | 6 | 1 | 8 | 1 |
|  |  | N2 = 2 |  |  |  |  | 7 |  |  |  | 7 |  |

In Table 7, W1 represents a wideband (and or longterm) PMI, W2 represents sub-band (and/or shortterm) PMI, and 1D among the x ports indicates that a port layout of the BS is 1D (for example, N2=1, and N1 and N2 represent the numbers of ports in the 1st and 2nd domains, respectively). Also, in Table 7, the blank spaces may correspond to the cases which are not defined, or not supported in the NR downlink codebook.

Config 1 is the same as LTE Class A Codebook Config 1, and Config 2 is the same as LTE Class A Codebook Config 2 when Config 2 is 2D, and Config 2 is the same as LTE Class A Codebook Config 4 when Config 2 is 1D.

Only Config 1 may exist in Rank 3 or higher.

Table 8 below shows an example of the configuration of a codebook payload in a multi-panel situation.

In Table 8, an X-pol antenna is assumed. Also, in Table 8, the blank spaces may correspond to the cases which are not defined, or not supported in the NR downlink codebook.

In Table 8, Ng represents the number of panels, and N1 and N2 represent the numbers of antenna ports of the 1st domain and the 2nd domain, respectively in a single panel configuring each of multiple panels.

Therefore, the number of final ports may be 2*Ng*N1*N2 and in the case of the multiple panels, only up to Rank 4 may be defined.

Since the payload size of the PMI in the case of type 1 CSI is smaller than that of the PMI in the case of type 2 CSI, type 1 CSI may be configured/applied even to reporting based on the PUCCH in addition to the PUSCH.

TABLE 8

|  | | 8 (2, 2, 1) | | | | 16 (2, 2, 2) | | | | 16 (2, 4, 1) | | | | 16 (4, 2, 1) | | | |
|---|---|---|---|---|---|---|---|---|---|---|---|---|---|---|---|---|---|
|  | Ng, | mode 1 | | mode 2 | | mode 1 | | mode 2 | | mode 1 | | mode 2 | | model 1 | | mode 2 | |
| x | N1, N2 | W1 | W2 | W1 | W2 | W1 | W2 | W1 | W2 | W1 | W2 | W1 | W2 | W1 | W2 | W1 | W2 |
| rank 1 |  | 5 | 2 | 7 | 4 | 8 | 2 | 10 | 4 | 6 | 2 | 8 | 4 | 9 | 2 |  |  |
| 2 |  | 6 | 1 | 8 | 3 | 10 | 1 | 12 | 3 | 8 | 1 | 10 | 3 | 10 | 1 |  |  |
| 3 |  | 5 | 1 | 7 | 3 | 10 | 1 | 12 | 3 | 8 | 1 | 10 | 3 | 9 | 1 |  |  |
| 4 |  | 5 | 1 | 7 | 3 | 10 | 1 | 12 | 3 | 8 | 1 | 10 | 3 | 9 | 1 |  |  |

|  | | 32 (2, 4, 2) | | | | 32 (4, 2, 2) | | | | 32 (2, 8, 1) | | | | 32 (4, 4, 1) | | | |
|---|---|---|---|---|---|---|---|---|---|---|---|---|---|---|---|---|---|
|  |  | mode 1 | | mode 2 | | mode 1 | | mode 2 | | mode 1 | | mode 2 | | mode 1 | | mode 2 | |
| x |  | W1 | W2 | W1 | W2 | W1 | W2 | W1 | W2 | W1 | W2 | W1 | W2 | W1 | W2 | W1 | W2 |
| rank 1 |  | 9 | 2 | 11 | 4 | 12 | 2 |  |  | 7 | 2 | 9 | 4 | 10 | 2 |  |  |
| 2 |  | 11 | 1 | 13 | 3 | 14 | 1 |  |  | 9 | 1 | 11 | 3 | 12 | 1 |  |  |
| 3 |  | 10 | 1 | 12 | 3 | 14 | 1 |  |  | 8 | 1 | 10 | 3 | 12 | 1 |  |  |
| 4 |  | 10 | 1 | 12 | 3 | 14 | 1 |  |  | 8 | 1 | 10 | 3 | 12 | 1 |  |  |

CSI Measurement and Reporting Procedure

The NR system supports more flexible and dynamic CSI measurement and reporting.

The CSI measurement may include a procedure of acquiring the CSI by receiving the CSI-RS and computing the received CSI-RS.

As time domain behaviors of the CSI measurement and reporting, aperiodic/semi-persistent/periodic channel measurement (CM) and interference measurement (IM) are supported.

A 4 port NZP CSI-RS RE pattern is used for configuring the CSI-IM.

CSI-IM based IMR of the NR has a similar design to the CSI-IM of the LTE and is configured independently of ZP CSI-RS resources for PDSCH rate matching.

In addition, in ZP CSI-RS based IMR, each port emulates an interference layer having (a preferable channel and) precoded NZP CSI-RS.

This is for intra-cell interference measurement with respect to a multi-user case and primarily targets MU interference.

The base station transmits the precoded NZP CSI-RS to the UE on each port of the configured NZP CSI-RS based IMR.

The UE assumes a channel/interference layer for each port and measures interference.

In respect to the channel, when there is no PMI and RI feedback, multiple resources are configured in a set and the base station or the network indicates a subset of NZP CSI-RS resources through the DCI with respect to channel/interference measurement.

Resource setting and resource setting configuration will be described in more detail.

Resource Setting

Each CSI resource setting 'CSI-ResourceConfig' includes a configuration for S≥1 CSI resource set (given by higher layer parameter csi-RS-ResourceSetList).

Here, the CSI resource setting corresponds to the CSI-RS-resourcesetlist.

Here, S represents the number of configured CSI-RS resource sets.

Here, the configuration for S≥1 CSI resource set includes each CSI resource set including CSI-RS resources (constituted by NZP CSI-RS or CSI IM) and an SS/PBCH block (SSB) resource used for L-RSRP computation.

Each CSI resource setting is positioned in a DL BWP (bandwidth part) identified by a higher layer parameter bwp-id.

In addition, all CSI resource settings linked to CSI reporting setting have the same DL BWP.

A time domain behavior of the CSI-RS resource within the CSI resource setting included in CSI-ResourceConfig IE is indicated by higher layer parameter resourceType and may be configured to be aperiodic, periodic, or semi-persistent.

The number S of configured CSI-RS resource sets is limited to '1' with respect to periodic and semi-persistent CSI resource settings.

Periodicity and slot offset which are configured are given in numerology of associated DL BWP as given by bwp-id with respect to the periodic and semi-persistent CSI resource settings.

When the UE is configured as multiple CSI-ResourceConfigs including the same NZP CSI-RS resource ID, the same time domain behavior is configured with respect to CSI-ResourceConfig.

When the UE is configured as multiple CSI-ResourceConfigs including the same CSI-IM resource ID, the same time domain behavior is configured with respect to CSI-ResourceConfig.

Next, one or more CSI resource settings for channel measurement (CM) and interference measurement (IM) are configured through higher layer signaling.

CSI-IM resource for interference measurement.

NZP CSI-RS resource for interference measurement.

NZP CSI-RS resource for channel measurement.

That is, channel measurement resource (CMR) may be NZP CSI-RS and interference measurement resource (IMR) may be NZP CSI-RS for CSI-IM and IM.

Here, CSI-IM (or ZP CSI-RS for IM) is primarily used for inter-cell interference measurement.

In addition, NZP CSI-RS for IM is primarily used for intra-cell interference measurement from multi-users.

The UE may assume CSI-RS resource(s) for channel measurement and CSI-IM/NZP CSI-RS resource(s) for interference measurement configured for one CSI reporting are 'QCL-TypeD' for each resource.

Resource Setting Configuration

As described, the resource setting may mean a resource set list.

In each trigger state configured by using higher layer parameter CSI-AperiodicTriggerState with respect to aperiodic CSI, each CSI-ReportConfig is associated with one or multiple CSI-ReportConfigs linked to the periodic, semi-persistent, or aperiodic resource setting.

One reporting setting may be connected with a maximum of three resource settings.

When one resource setting is configured, the resource setting (given by higher layer parameter resourcesForChannelMeasurement) is for channel measurement for L1-RSRP computation.

When two resource settings are configured, a first resource setting (given by higher layer parameter resourcesForChannelMeasurement) is for channel measurement and a second resource setting (given by csi-IM-ResourcesForInterference or nzp-CSI-RS-ResourcesForInterference) is for interference measurement performed on CSI-IM or NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement, and a third resource setting (given by nzp-CSI-RS-ResourcesForInterference) is for NZP CSI-RS based interference measurement.

Each is linked to periodic or semi-persistent resource setting with respect to semi-persistent or periodic CSI.

When one resource setting (given by resourcesForChannelMeasurement) is configured, the resource setting is for channel measurement for L-RSRP computation.

When two resource settings are configured, a first resource setting (given by resourcesForChannelMeasurement) is for channel measurement and a second resource setting (given by higher layer parameter csi-IM-ResourcesForInterference) is for interference measurement performed on CSI-IM.

CSI measurement related CSI computation will be described.

When interference measurement is performed on CSI-IM, each CSI-RS resource for channel measurement is associated with the CSI-IM resource for each resource by an order of CSI-RS resources and CSI-IM resources within a corresponding resource set.

The number of CSI-RS resources for channel measurement is equal to the number of CSI-IM resources.

In addition, when the interference measurement is performed in the NZP CSI-RS, the UE does not expect to be configured as one or more NZP CSI-RS resources in the associated resource set within the resource setting for channel measurement.

A UE in which Higher layer parameter nzp-CSI-RS-ResourcesForInterference is configured does not expect that 18 or more NZP CSI-RS ports will be configured in the NZP CSI-RS resource set.

For CSI measurement, the UE assumes the followings.
Each NZP CSI-RS port configured for interference measurement corresponds to an interference transport layer.
All interference transport layers of the NZP CSI-RS port for interference measurement consider an energy per resource element (EPRE) ratio.
Different interference signals on RE(s) of the NZP CSI-RS resource for channel measurement, the NZP CSI-RS resource for interference measurement, or CSI-IM resource for interference measurement.

A CSI reporting procedure will be described in more detail.

For CSI reporting, time and frequency resources which may be used by the UE are controlled by the base station.

The channel state information (CSI) may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), and L1-RSRP.

For the CQI, PMI, CRI, SSBRI, LI, RI, and L1-RSRP, the UE is configured by a higher layer as N≥1 CSI-ReportConfig reporting setting, M≥1 CSI-ResourceConfig resource setting, and a list (provided by aperiodicTriggerStateList and semiPersistentOnPUSCH) of one or two trigger states.

In the aperiodicTriggerStateList, each trigger state includes the channel and an associated CSI-ReportConfigs list optionally indicating resource set IDs for interference.

In the semiPersistentOnPUSCH-TriggerStateList, each trigger state includes one associated CSI-ReportConfig.

In addition, the time domain behavior of CSI reporting supports periodic, semi-persistent, and aperiodic.

Hereinafter, each of periodic, semi-persistent (SP), and aperiodic CSI reporting will be described.

The periodic CSI reporting is performed on short PUCCH and long PUCCH.

The periodicity and slot offset of the periodic CSI reporting may be configured as RRC and refer to the CSI-ReportConfig IE.

Next, SP CSI reporting is performed on short PUCCH, long PUCCH, or PUSCH.

In the case of SP CSI on the short/long PUCCH, the periodicity and the slot offset are configured as the RRC and the CSI reporting to separate MAC CE is activated/deactivated.

In the case of the SP CSI on the PUSCH, the periodicity of the SP CSI reporting is configured as the RRC, but the slot offset is not configured as the RRC and the SP CSI reporting is activated/deactivated by DCI (format 0_1).

An initial CSI reporting timing follows a PUSCH time domain allocation value indicated in the DCI and a subsequent CSI reporting timing follows a periodicity configured as the RRC.

Separated RNTI (SP-CSI C-RNTI) is used with respect to the SP CSI reporting on the PUSCH.

DCI format 0_1 may include a CSI request field and may activate/deactivate a specific configured SP-CSI trigger state.

In addition, the SP CSI reporting has the same or similar activation/deactivation as a mechanism having data transmission on SPS PUSCH.

Next, the aperiodic CSI reporting is performed on the PUSCH and is triggered by the DCI.

In the case of AP CSI having AP CSI-RS, an AP CSI-RS timing is configured by the RRC.

Here, a timing for the AP CSI reporting is dynamically controlled by the DCI.

The NR does not adopt a scheme (for example, transmitting RI, WB PMI/CQI, and SB PMI/CQI in order) of dividing and reporting the CSI in multiple reporting instances applied to PUCCH based CSI reporting in the LTE.

Instead, the NR restricts specific CSI reporting not to be configured in the short/long PUCCH and a CSI omission rule is defined.

In addition, in relation with the AP CSI reporting timing, a PUSCH symbol/slot location is dynamically indicated by the DCI. In addition, candidate slot offsets are configured by the RRC.

For the CSI reporting, slot offset(Y) is configured for each reporting setting.

For UL-SCH, slot offset K2 is configured separately.

Two CSI latency classes (low latency class and high latency class) are defined in terms of CSI computation complexity.

The low latency CSI is a WB CSI that includes up to 4 ports Type-I codebook or up to 4-ports non-PMI feedback CSI.

The high latency CSI refers to CSI other than the low latency CSI.

For a normal UE, (Z, Z') is defined in a unit of OFDM symbols.

Z represents a minimum CSI processing time from the reception of the aperiodic CSI triggering DCI to the execution of the CSI reporting.

Z' represents a minimum CSI processing time from the reception of the CSI-RS for channel/interference to the execution of the CSI reporting.

Additionally, the UE reports the number of CSIs which may be simultaneously calculated.

CSI Reporting Using PUSCH

Figure 10:
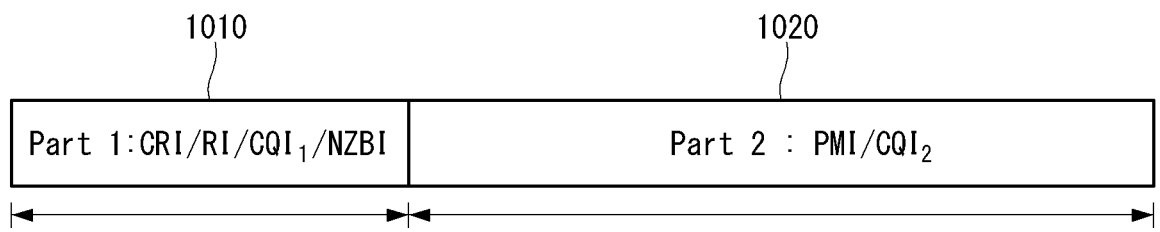
FIG. 10 illustrates an example of an information payload of PUSCH based CSI reporting.

FIG. 10 illustrates an example of an information payload of PUSCH based CSI reporting.

NZBI is a parameter representing an indication of the number of non-zero wideband amplitude coefficients per layer for the Type II PMI codebook.

That is, NZBI is a parameter representing an indication of the number of non-zero wideband amplitude coefficients per layer for the Type II PMI codebook.

That is, NZBI is an indicator indicating 0 or a relative amplitude coefficient other than 0.

Alternatively, NZBI may represent the number of zero amplitude beams or non-zero amplitude beams and may be referred to as N_RPI0.

When decoding for the DCI is successful, the UE performs aperiodic CSI reporting using the PUSCH of a serving cell c.

The aperiodic CSI reporting performed on the PUSCH supports wideband and sub-band frequency granularity.

The aperiodic CSI reporting performed on the PUSCH supports Type I and Type II CSIs.

When decoding DCI format 0_1 activating a semi-persistent (SP) CSI trigger state is successful, the UE performs SP CSI reporting for the PUSCH.

DCI format 01 includes a CSI request field indicating the SP CSI trigger state to be activated or deactivated.

The SP CSI report for the PUSCH supports Type I and Type II CSIs with the wideband and sub-band frequency granularity.

The PUSCH resource and the modulation and coding scheme (MCS) for the SP CSI reporting are semi-permanently allocated by the UL DCI.

The CSI reporting for the PUSCH may be multiplexed with UL data on the PUSCH.

Further, the CSI reporting for the PUSCH may be performed without multiplexing with the UL data.

Figure 11:
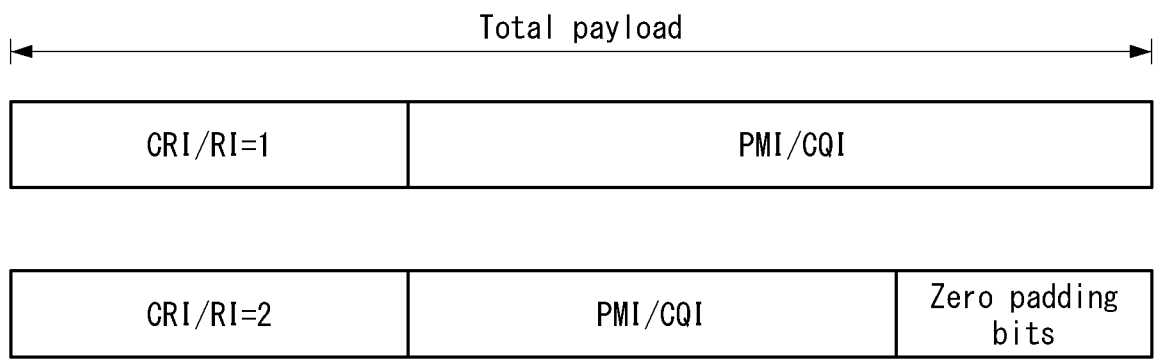
FIG. 11 illustrates an example of an information payload of short PUCCH based CSI reporting.

For Type I and Type II CSIs on the PUSCH, the CSI reporting includes two parts (Part 1 and Part 2) as illustrated in FIG. 11.

Part 1 1010 is used for identifying the number of information bits of Part 2 1020. The entirety of Part 1 is transmitted before Part 2.

For Type I CSI feedback, Part 1 contains an RI (if reported), a CRI (if reported), and a CQI of a first codeword.

Part 2 includes a PMI and includes a CQI for a second codeword when RI>4.

For Type II CSI feedback, Part 1 has a fixed payload size and includes the RI, the CQI and an indication (NZBI) for the number of non-zero wideband amplitude coefficients per layer for Type II CSI.

In Part 1, the RI, the CQI, and the NZBI are separately encoded.

Part 2 includes the PMI of Type II CSI.

Parts 1 and 2 are encoded separately.

Type II CSI report carried on PUSCH are calculated independently of all Type II CSI reporting carried in PUCCH format 1, 3, or 4.

When a higher layer parameter reportQuantity is set to one of values 'cri-RSRP' and 'ssb-Index-RSRP', the CSI feedback is constituted by a single part.

For Type I and Type II CSI reporting configured for the PUCCH but transmitted on the PUSCH, an encoding scheme follows an encoding scheme of the PUCCH.

When the CSI reporting includes two parts in the PUSCH and a CSI payload to be reported has a smaller payload size provided in a PUSCH resource allocated for CSI reporting, the UE may omit some of Part 2 CSI.

Omission of Part 2 CSI is determined according to the priority and Priority 0 is a highest priority and the priority has a lowest priority.

CSI Reporting Using PUCCH

The UE is semi-statically configured by a higher layer in order to perform the periodic CSI reporting on the PUCCH.

The UE may be configured as the higher layer for multiple periodic CSI reports corresponding to a CSI report setting indication in which the associated CSI measurement link and CSI resource setting are configured as one or more higher layers set as the higher layer.

Periodic CSI reporting in PUCCH format 2, 3 or 4 supports Type I CSI in units of a broadband.

For the SP CSI on the PUSCH, the UE performs the SP CSI report in the PUCCH applied starting from slot $n + \lceil 3N \rceil\_slot\hat{}(subframe, \mu) + 1$ after HARQ-ACK corresponding to carrying the selection command is transmitted in slot n.

The selection command includes one or more report setting indications in which the associated CSI resource setting is configured.

In the PUCCH, the SP CSI report supports Type I CSI.

The SP CSI report for PUCCH format 2 supports Type I CSI having the broadband frequency granularity. In PUCCH format 3 or 4, the SP CSI report supports Type I sub-band CSI and Type II CSI with the wideband frequency granularity.

When the PUCCH carries Type I CSI with the broadband frequency granularity, the CSI payload carried by PUCCH format 2 and PUCCH format 3 or 4 is the same regardless of the RI (if reported) and the CRI (if reported).

In the case of Type I CSI sub-band report in PUCCH format 3 or 4, the payload is split into two parts.

A first part (Part 1) includes RI (if reported), CRI (if reported), and CQI of the first codeword.

A second part (Part 2) includes a PMI and includes a CQI for the second codeword when RI>4.

The SP CSI reporting carried in PUCCH format 3 or 4 supports Type II CSI feedback, but supports only Part 1 of Type II CSI feedback.

In PUCCH format 3 or 4 supporting Type II, the CSI report may depend on a UE capability.

Type II CSI report (corresponding only Part 1) carried in PUCCH format 3 or 4 is calculated independently of Type II CSI report carried in the PUSCH.

When the UE is configured as the CSI reporting in PUCCH format 2, 3, or 4, each PUCCH resource is configured for each candidate UL BWP.

In the case where the UE is configured with an active SP CSI report configuration in the PUCCH and does not receive a deactivation command, a BWP in which the CSI reporting is performed is an active BWP, the CSI is performed and if not, the CSI reporting is suspended. Such an operation is also similarly applied to a case of P CSI on PUCCH. When BWP switching occurs with respect to PUSCH based SP CSI reporting, it is appreciated that the corresponding CSI reporting is automatically deactivated.

Table 9 shows an example of a PUCCH format.

TABLE 9

| PUCCH format | Length in OFDM symbols $N_{symb}^{PUCCH}$ | Number of bits |
|---|---|---|
| 0 | 1-2 | ≤2 |
| 1 | 4-14 | ≤2 |
| 2 | 1-2 | >2 |
| 3 | 4-14 | >2 |
| 4 | 4-14 | >2 |

In Table 9, $N_{symb}^{PUCCH}$ represents the length of the PUCCH transmission in the OFDM symbol.

In addition, the PUCCH format is divided into short PUCCH or long PUCCH according to the length of the PUCCH transmission.

In Table 9, PUCCH formats 0 and 2 may be referred to as the short PUCCH and PUCCH formats 1, 3, and 4 may be referred to as the long PUCCH.

Hereinafter, PUCCH based CSI reporting will be divided into short PUCCH based CSI reporting and long PUCCH based CSI reporting and more specifically described.

FIG. 11 illustrates an example of an information payload of short PUCCH based CSI reporting.

The short PUCCH based CSI reporting is used only for wideband CSI reporting.

The short PUCCH based CSI reporting has the same information payload regardless of the RI/CRI in a given slot (to avoid blind decoding).

The size of the information payload may vary depending on most CSI-RS ports of the CSI-RS configured in the CSI-RS resource set.

When the payload including the PMI and the CQI are diversified into the RI/CQI, padding bits are added to the RI/CRI/PMI/CQI prior to encoding to equalize the payload associated with different RI/CRI values.

In addition, the RI/CRI/PMI/CQI may be encoded together with the padding bit.

Next, the long PUCCH based CSI reporting will be described.

Figure 12:
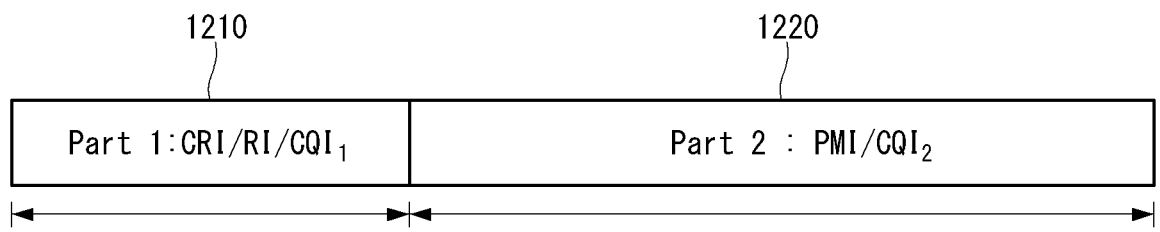
FIG. 12 illustrates an example of an information payload of long PUCCH based CSI reporting.

FIG. 12 illustrates an example of an information payload of long PUCCH based CSI reporting.

The long PUCCH based CSI reporting may use the same solution as the short PUCCH for the wideband reporting.

In addition, the long PUCCH based CSI reporting has the same payload regardless of the RI/CRI.

Further, two-part encoding (For Type I) is applied to subband reporting.

Part 1 1210 may have a fixed payload according to the number of ports, a CSI type, RI restriction, etc. and Part 2 1220 may have various payload sizes according to Part 1.

The CRI/RI may be first decoded in order to determine the payload of the PMI/CQI.

In addition, CQIi(i=1,2) corresponds to CQI for an i-th codeword (CW).

For long PUCCH, only Part 1 may be carried in Type II CSI reporting.

In this case, when the CSI of Type I and the CSI of Type II used in the system such as the NR are considered, for example, in the case of carrier aggregation or the CSI of Type II, the size of the PMI depending on an increase in rank almost linearly increases.

In this case, there is a problem in that the size (or coding rate) of the CSI reported by the UE may be larger than the size of the resource (or coding rate) allocated by the base station for uplink control information (UCI).

Accordingly, the present invention proposes a method for adjusting the size of the CSI reported by the UE according to the resource allocated by the base station in order to solve such a problem.

Figure 13:
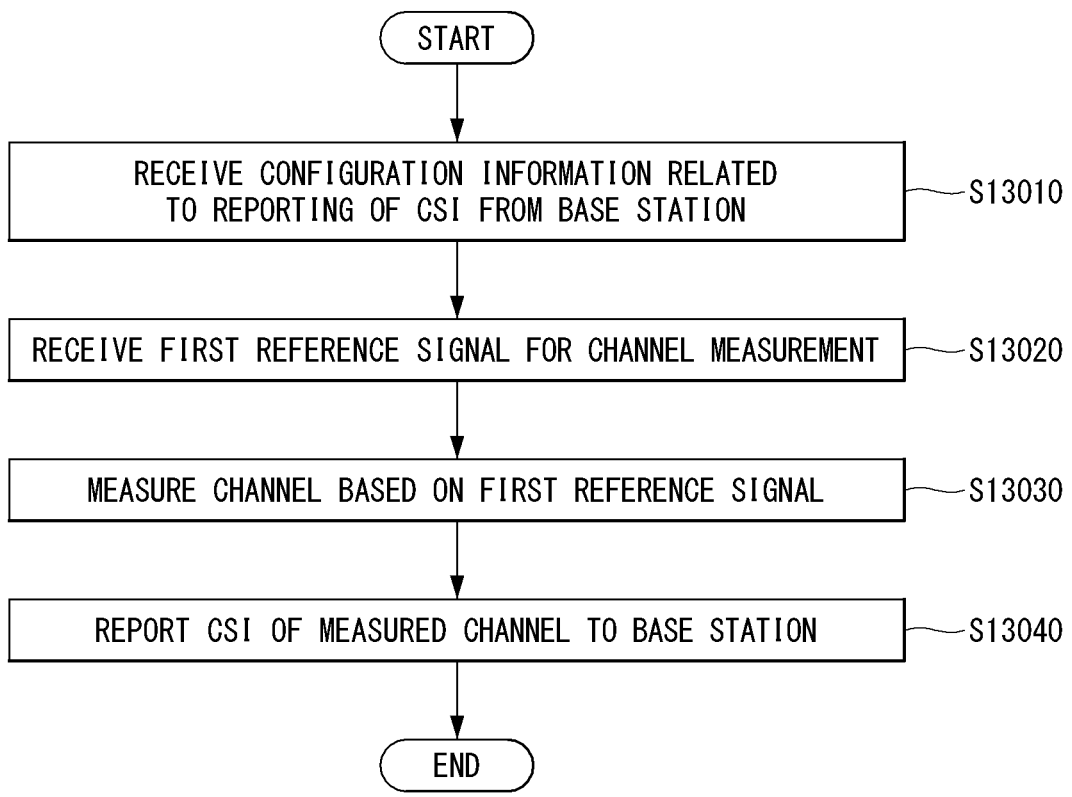
FIG. 13 is a flowchart illustrating an example of a method for reporting CSI to a base station by a user equipment, which is proposed in the present specification.

FIG. 13 is a flowchart illustrating an example of a method for reporting CSI to a base station by a user equipment, which is proposed in the present specification.

Referring to FIG. 13, when the UE measures the channel based on the CSI-RS transmitted from the base station and transmits the measured CSI to the base station, in the case where the measured CSI does not satisfy a configured specific condition, reporting some or all of the CSI may be omitted.

Specifically, the UE receives configuration information related to the CSI from the base station (S13010). The UE may recognize the reporting method, the parameter to be reported, and the like through the configuration information.

The configuration information may be transmitted through the RRC or downlink control information (DCI) and the configuration information may include a threshold value related to a specific condition for receiving the CSI.

For example, when the size of the CSI by the UE is larger than the resource for the CSI allocated by the base station, the configuration information may include a specific condition (for example, the coding rate, etc.) for omitting some or all of the CSI.

In this case, the specific condition may be dynamically configured through the DCI of the base station, etc.

Thereafter, the UE may receive a first reference signal (for example, CSI-RS) for channel measurement from the base station and measure the channel based on the received first reference signal (S13020 and S13030).

That is, the UE may compute a CSI value for averaging and reporting the received first reference signal.

The CSI may be split into two parts as described in FIGS. 10 to 12.

That is, when the CSI is constituted by the first part and the second part, each part may be configured as described above.

For example, the first part may include a rank indicator (RI), a channel quality indicator (CQI), and NZBI which is an indicator indicating the number of beams having the amplitude other than 0 and the second part may include a precoding matrix indicator (PMI).

In this case, when the computed CSI value does not satisfy the specific condition transmitted from the base station, the UE may perform a specific operation so that the computed CSI value may satisfy the specific condition.

For example, when the specific condition is the size (or coding rate) of the resource allocated by the base station for the CSI reporting and the calculated CSI size is larger than the allocated resource, the UE may adjust the calculated CSI size according to the allocated resource.

As an example of a method for adjusting the size of the CSI by the UE, when the specific condition is the threshold value of the coding rate configured by the base station and the calculated coding rate of the CSI is larger than the threshold value configured by the base station, the UE may omit some or all of the CSI in order to set the coding rate to be equal to the threshold value.

In this case, in the CSI, some or all of Part 2 may be omitted and the subbands may be omitted according to an index of the subband.

That is, the subband may be omitted according to an order in which the index of the subband is higher or an order in which the index of the subband is lower until the threshold value of the coding rate and a value of the coding rate of the CSI to be reported by the UE are equal to each other.

Hereinafter, a specific method of the method for adjusting the size of the CSI by the UE will be described below in detail.

Thereafter, the UE may report the CSI of the measured channel to the base station (S13040).

Through such a method, when the CSI value of the measured channel is larger than the size of the resource allocated by the base station, the UE may adjust the CSI value and report the adjusted CSI value to the base station.

The UE may be constituted by a processor, an RF unit, and a memory as illustrated in FIGS. 23 to 26 and the processor may control the RF unit to receive the configuration information related to the CSI from the base station.

The processor of the UE may recognize the reporting method, the parameter to be reported, and the like through the configuration information.

In this case, the configuration information may be transmitted through the RRC or downlink control information (DCI) and the configuration information may include a threshold value related to a specific condition for receiving the CSI.

For example, when the size of the CSI by the UE is larger than the resource for the CSI allocated by the base station, the configuration information may include a specific condition (for example, the coding rate, etc.) for omitting some or all of the CSI.

In this case, the specific condition may be dynamically configured through the DCI of the base station, etc.

Further, the processor may control the RF unit to receive the first reference signal (for example, CSI-RS) for channel measurement from the base station and measure the channel based on the received first reference signal.

That is, the processor may compute the CSI value for averaging and reporting the received first reference signal.

The CSI may be split into two parts as described in FIGS. 10 to 12.

That is, when the CSI is constituted by the first part and the second part, each part may be configured as described above.

For example, the first part may include a rank indicator (RI), a channel quality indicator (CQI), and NZBI which is an indicator indicating the number of beams having the amplitude other than 0 and the second part may include a precoding matrix indicator (PMI).

In this case, the processor of the UE may perform a specific operation so that the computed CSI value may satisfy the specific condition when the computed CSI value does not satisfy the specific condition transmitted from the base station.

For example, when the specific condition is the size (or coding rate) of the resource allocated by the base station for the CSI reporting and the calculated CSI size is larger than the allocated resource, the UE may adjust the calculated CSI size according to the allocated resource.

As an example of a method for adjusting the size of the CSI by the UE, when the specific condition is the threshold value of the coding rate configured by the base station and the calculated coding rate of the CSI is larger than the threshold value configured by the base station, the UE may omit some or all of the CSI in order to set the coding rate to be equal to the threshold value.

In this case, in the CSI, some or all of Part 2 may be omitted and the subbands may be omitted according to an index of the subband.

That is, the subband may be omitted according to an order in which the index of the subband is higher or an order in which the index of the subband is lower until the threshold value of the coding rate and a value of the coding rate of the CSI to be reported by the UE are equal to each other.

Further, the processor may control the RF unit to report the CSI of the measured channel to the base station.

Figure 14:
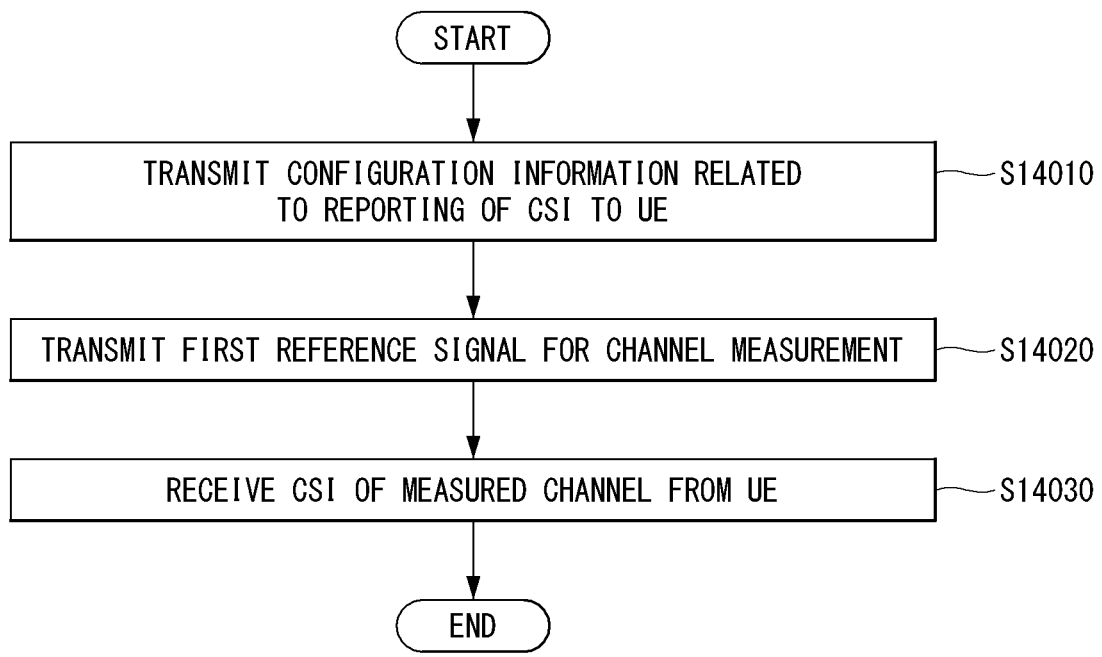
FIG. 14 is a flowchart illustrating an example for receiving CSI from the user equipment by the base station, which is proposed in the present specification.

FIG. 14 is a flowchart illustrating an example for receiving CSI from the user equipment by the base station, which is proposed in the present specification.

Referring to FIG. 14, when the value of the CSI calculated by the UE is larger than the size of the configured resource, the base station may receive only some of the CSI or not receive all of the CSI.

Specifically, the base station transmits configuration information related to the CSI to the UE (S14010). The UE may recognize the reporting method, the parameter to be reported, and the like through the configuration information transmitted from the base station.

The configuration information may be transmitted through the RRC or downlink control information (DCI) and the configuration information may include a threshold value related to a specific condition for receiving the CSI.

For example, when the size of the CSI by the UE is larger than the resource for the CSI allocated by the base station, the configuration information may include a specific condition (for example, the coding rate, etc.) for omitting some or all of the CSI.

In this case, the specific condition may be dynamically configured through the DCI of the base station, etc.

Thereafter, the base station may transmit the first reference signal (for example, CSI-RS) for channel measurement to the UE (S14020).

The base station may be reported the CSI of the channel measured based on the first reference signal from the UE (S14030).

In this case, the reporting of the CSI may be performed while being split into two parts as described in FIGS. 10 to 12.

That is, when the CSI is constituted by the first part and the second part, each part may be configured as described above.

For example, the first part may include a rank indicator (RI), a channel quality indicator (CQI), and NZBI which is an indicator indicating the number of beams having the amplitude other than 0 and the second part may include a precoding matrix indicator (PMI).

In this case, when the CSI value computed by the UE does not satisfy the specific condition transmitted from the base station, the UE may perform the specific operation so that the CSI value may satisfy the specific condition.

For example, when the specific condition is the size (or coding rate) of the resource allocated by the base station for the CSI reporting and the calculated CSI size is larger than the allocated resource, the UE may adjust the calculated CSI size according to the allocated resource.

As an example of a method for adjusting the size of the CSI by the UE, when the specific condition is the threshold value of the coding rate configured by the base station and the calculated coding rate of the CSI is larger than the threshold value configured by the base station, the UE may omit some or all of the CSI in order to set the coding rate to be equal to the threshold value.

In this case, in the CSI, some or all of Part 2 may be omitted and the subbands may be omitted according to an index of the subband.

That is, the subband may be omitted according to an order in which the index of the subband is higher or an order in which the index of the subband is lower until the threshold value of the coding rate and a value of the coding rate of the CSI to be reported by the UE are equal to each other.

Hereinafter, a specific method of the method for adjusting the size of the CSI by the UE will be described below in detail.

Therefore, when the CSI value computed by the UE does not satisfy the specific condition transmitted from the base station, the base station may receive only some of the CSI or may not receive all of the CSI.

The base station may be constituted by the processor, the RF unit, and the memory as illustrated in FIGS. 23 to 26 and the processor may control the RF unit to transmit the configuration information related to the CSI to the UE.

In this case, the configuration information may be transmitted through the RRC or downlink control information (DCI) and the configuration information may include a threshold value related to a specific condition for receiving the CSI.

For example, when the size of the CSI by the UE is larger than the resource for the CSI allocated by the base station, the configuration information may include a specific condition (for example, the coding rate, etc.) for omitting some or all of the CSI.

In this case, the specific condition may be dynamically configured through the DCI of the base station, etc.

Further, the processor may control the RF unit to transmit the first reference signal (for example, CSI-RS) for channel measurement to the UE and to be reported the CSI of the channel measured based on the first reference signal from the UE.

In this case, the reporting of the CSI may be performed while being split into two parts as described in FIGS. 10 to 12.

That is, when the CSI is constituted by the first part and the second part, each part may be configured as described above.

For example, the first part may include a rank indicator (RI), a channel quality indicator (CQI), and NZBI which is an indicator indicating the number of beams having the amplitude other than 0 and the second part may include a precoding matrix indicator (PMI).

In this case, when the CSI value computed by the UE does not satisfy the specific condition transmitted from the base station, the UE may perform the specific operation so that the CSI value may satisfy the specific condition.

For example, when the specific condition is the size (or coding rate) of the resource allocated by the base station for the CSI reporting and the calculated CSI size is larger than the allocated resource, the UE may adjust the calculated CSI size according to the allocated resource.

As an example of a method for adjusting the size of the CSI by the UE, when the specific condition is the threshold value of the coding rate configured by the base station and the calculated coding rate of the CSI is larger than the threshold value configured by the base station, the UE may omit some or all of the CSI in order to set the coding rate to be equal to the threshold value.

In this case, in the CSI, some or all of Part 2 may be omitted and the subbands may be omitted according to an index of the subband.

That is, the subband may be omitted according to an order in which the index of the subband is higher or an order in which the index of the subband is lower until the threshold value of the coding rate and a value of the coding rate of the CSI to be reported by the UE are equal to each other.

Therefore, when the CSI value computed by the UE does not satisfy the specific condition transmitted from the base station, the base station may receive only some of the CSI or may not receive all of the CSI.

Hereinafter, when the CSI value of the measured channel by the UE is larger than the resource allocated for CSI reporting by the base station, a method for adjusting the CSI value will be described in detail.

In the case of Type II CSI, the PMI may be generated by a linear combination (phase and amplitude) of a plurality of 2D-DFTs and in this case, the PMI may be independently determined for each layer. That is, as the number of layers increases, the PMI increases almost linearly, which may lead to a larger payload size difference depending on the rank in the subband report.

In this case, the base station may continuously allocate the resources for the CSI reporting to the UE considering rank 2.

However, when the resources are continuously allocated by considering rank 2, in the case of the CSI report according to rank 1, the waste of the resources may become large. Therefore, the base station may signal information (for example, rank information and payload size information) that may affect the entire CSI feedback payload of the UE to the higher layer (for example, RRC, MAC CE, and DCI).

The UE may calculate the CSI according to the information signaled by the base station and report the calculated CSI to the base station. In this case, when the UE desires to change the entire payload of the CSI to be transmitted, for example, the UE may request a change in rank or payload size to the base station through separate feedback (or signaling) due to a change in transmission rank, etc.

Alternatively, when the base station transmits information which may affect the entire CSI feedback payload to the UE through the higher layer signaling, the base station may additionally inform the UE of information related to CSI dropping (or omission) to be described below.

In the configuration for the CSI feedback payload, a resource to which the UCI which is piggy-backed to the PUSCH, that is, a payload of the reported CSI may be allocated by using information corresponding to Part 1 (for example, RI, CQI, and # of non-zero amplitude information (NZBI)) constituting the CSI of Type II transmitted when the PUCCH and the PUSCH are simultaneously triggered.

In this case, when a collision occurs between the reporting of the PUCCH and the reporting of the PUSCH, the CSI of the PUCCH may be dropped and only the CSI of the PUSCH may be transmitted.

When the payload allocated by such a method and PUSCH-based reporting is sufficient, the UE may encode the CSI as it is and transmit the CSI to the base station and when the size of the payload is larger than the size of the allocated resource, some or all of the CSI may be omitted by a method to be described below.

Alternatively, only when the size of the payload is not larger than a specific rate (X=(Current Payload)/(Allocated payload)) X % (for example, X=110%) which is configured by the base station or is predetermined, the UE may encode the CSI with a high coding rate and transmit the encoded CSI to the base station without omitting the calculated CSI.

Here, the allocated payload (for example, calculated by allocated RB and assigned MCS given in DCI) may mean information and/or sizes of coded bits allocated for PUSCH-based reporting of the UE by the base station.

A current payload may mean information and/or sizes of coded bits of the CSI calculated at a reporting time. Here, the CSI may be all (CSIs of Parts 1 and 2).

Alternatively, the CSI is the CSI (e.g., Part 2 CSI) of a specific part or a coding rate applied to the size (for example, the CSI of Part 2) of RE allocated for PUSCH-based reporting is equal to or larger than a specific value (e.g., 4/5), a method for omitting the CSI to be described below may be adopted.

Alternatively, when ((Current Payload)/(Allocated # of RE)) is X times larger than spectral efficiency (SE) of MCS scheduled to transmission of data when the UCI is piggy-backed to the PUSCH (e.g., X=1.1), an omission method of the CSI described below may be configured to be adopted. Here, an X value may be previously defined or configured through the higher layer signaling.

For example, when the specific condition for the CSI reporting configured by the base station is the threshold value of the coding rate and the coding rate of the calculated CSI is larger than the threshold value configured by the base station, the UE may omit some or all of the CSI in order to set the coding rate to be equal to the threshold value.

That is, some or all of Part 2 may be omitted until the coding rate is equal to the threshold value.

Specifically, if the coding rate of the calculated CSI is larger than the threshold value configured by the base station, the UE may omit some or all of Part 2 of the CSI according to the priority or level of the subband until the coding rate is equal to the threshold value.

The base station may promise a size (for example, Part 2 CSI) of information which may be maximally fed back to the UE in advance or inform the UE the size to the UE through the higher layer (MAC CE or DCI).

In this case, the information of the size which may be fed back may be size (for example, Part 2 CSI size) or rank information of all bits related to information to be fed back.

When the calculated CSI is larger than a size which may be maximally fed back, the UE may omit some or all of the CSI through an omission method of the CSI to be described below.

When bits of the CSI to be fed back are indicated by using the DCI, bits indicating the bits of the CSI may be indicated while being jointly encoded with other information indicated within the CSI request field.

This case, may be more useful when the UCI is transmitted together with data. In the case of the CSI of Type II, specific Part 1 may be transmitted through periodic transmission. In this case, when the base station performs the PUSCH-based reporting, the base station previously estimates the rank of the UE by information of Part 1 received by a most recently received periodic report, etc. (hybrid reporting may be used even in the case of Type I) to allocate the resource for PUSCH transmission.

Such a method may be used in combination with the method for omitting some or all of the CSI by setting the maximum coding rate (or threshold value) described above.

For example, in the case where the threshold of the coding rate in which the CSI of Part 2 is omitted is 0.75, the code rate-based CSI omission may be performed when the code rate related to the MCS indicated by the UE is near the above value (0.75).

When the code rate associated with the indicated MCS is approximately 0.3, the UCI (in the case of UCI on PUSCH with data) which is piggy-backed to the data has a value near 0.3, and as a result, the omission of the CSI may not be normally performed.

Accordingly, in this case, as the CSI omission method based on the maximum coding rate, which is proposed as above, the CSI omission may effectively operate.

Alternatively, an MCS range in which the coding rate based CSI omission operates may be promised in advance or indicated to the UE through the higher layer signaling (for example, RRC, MAC CE, or DCI). As another scheme, the UE may inform the base station of which scheme is to be used through the higher layer signaling among three CSI omission methods.

Hereinafter, a method for omitting the CSI will be described in detail.

<Proposal 1>

When the size of the resource allocated by the base station for the CSI report is smaller than the size of the payload of the CSI to be reported by the UE, the UE may omit and report some or all of Part 2 of the CSI.

Specifically, when the UE is configured as subband reporting and PUSCH-based reporting and the payload size of the CSI to be reported by the UE is larger than the payload size corresponding to the resource size allocated for the UCI, reporting of CSI (e.g., PMI) of Part 2 related to all subbands (SBs) may be omitted and a wide-band (WB) PMI may be calculated and reported.

In this case, the base station may recognize whether the PMI reported through the size of the transmitted PMI (for example, Part 2) is the WB or the SB by using two blind decoding operations.

For example, when it is assumed that the payload of the WB PMI is 20 and the number of configured SBs is 10, the SB PMI becomes 200, so that blind decoding may be performed according to 20 bits and 200 bits, respectively.

Alternatively, when the PMI of the SB is omitted, the UE may additionally feed back a 1-bit indicator (for example, reporting mode indicator) indicating whether the CSI reported to the base station is the WB PMI or the SB PMI.

In this case, the indicator may be included in the CSI of Part 1 or may be fed back to a separate part.

For example, when the reporting mode indicator is "0", the indicator may represent the WB PMI and when the reporting mode indicator "1", the indicator may represent the SB PMI.

Further, when the CQI s) corresponding to the SB is reported to Part 1 of the CSI as it is, the base station may predict the SB PMI through a process such as interpolation and/or PMI compensation by using the reported WB CQI, SB CQI, and WB PMI and may perform frequency selective precoding by using the predicted SB PMI.

Alternatively, in order to reduce the payload size of the CSI of Part 1, only the WB CQI may be included in Part 1 and fed back together with the reporting mode indicator.

In this case, in the case of decoding of Part 1, two blind decoding operations may be performed. That is, a blind decoding process using the payload assuming a case where there is only the WB CQI and blind decoding assuming the payload including the SB CQI may be performed.

Therefore, in the case of the UE configured as the SB reporting mode (that is, when the reporting mode indicator is set to "1"), both the WB CQI and the SB CQI are included in Part 1, but the UE may inform the base station that the SB CQI represents a specific state (for example, as a name of "out of range" or "PMI dropping") to indicate that all SB PMIs are dropped.

<Proposal 1-1>

When the UE is configured as the SB reporting and PUSCH-based reporting and the payload size of the CSI to be reported is larger than the payload size for the resource allocated for the UCI, reporting of the CSI (for example, PMI) of Part 2 associated with all SBs may be omitted (or dropped).

In this case, the UE may report the CSI of Part 1 including the 1-bit indicator associated with whether the CSI is reported in order to inform the base station of a fact that the CSI of Part 2 is not reported.

For example, when the value of the indicator is "0", the value of the indicator may indicate that the CSI of Part 2 is omitted and when the value of the indicator is "1", the value of the indicator may indicate that the CSI of Part 2 is not omitted.

In this case, when the CSI of Part 2 is omitted, the UE may configure the CSI of Part 1 so that # of non-zero Wideband amplitude coefficients per layer included in the CSI of Part 1 continuously has the value of "0".

That is, all values of candidate (2L-1)*2 amplitude coefficients at the time of configuring the CSI of Type II become 0, and as a result, the base station may recognize that SB phase and/or WB amplitude information corresponding to combining need not be reported.

# of non-zero Wideband amplitude coefficients per layer may have one value in the case of joint encoding and # of non-zero Wideband amplitude coefficients per layer may have each value depending on the layer in the case of independent encoding for each layer.

When the UCI is piggy backed to the PUSCH (that is, when the UCI and the PUSCH are simultaneously transmitted, a transmission capability (for example, spectral efficiency) of the PUSCH may be enhanced by using a resource corresponding to the payload allocated to Part 2 for transmitting the PUSCH.

When only the UCI is reported alone, the CSI of Part 2 is omitted in Proposal 1-1 and only the CSI of Part 1 is transmitted to reduce uplink interference.

Further, when only the CSI of Part 1 is reported, the base station may trigger PUSCH-based reporting again within a specific time (may be set to a time when information including T, RI, etc. is not changed) from a time of receiving the CSI of Part 1 in order to well use the configuration of the payload depending on the information of the RI included in Part 1.

Alternatively, when the CSI of Part 1 is received in the PUSCH-based reporting, the base station may perform resource allocation by assuming a largest payload size (for example, in the case of Type II, rank 2 SB reporting) and/or trigger an immediately next aperiodic reporting (PUSCH-based reporting) by configuring UCI only feedback.

<Proposal 2>

When the size of the resource allocated by the base station for the CSI report is smaller than the size of the payload of the CSI to be reported by the UE, the UE may change and report the type of CSI.

Specifically, when the UE is set as Type II CSI, SB reporting, and PUSCH-based reporting and the payload size of the CSI to be reported is larger than the payload size for the resource allocated for the UCI, the UE may report CRI/RI, CQI, and PMI according to CSI of Type I by falling back to the CSI of Type I instead of omitting (or dropping) all or some of the CSI of Part 2 of Type L1.

When the size of the resource allocated for the UCI by the terminal set as Type II CSI by the base station or a transmittable capacity (hereinafter referred to as a reporting container) is smaller than the payload size of the CSI to be reported by the UE, the UE may report that the non-zero wideband amplitude coefficients per layer in the CSI of Part 1 described above has the value of "0".

That is, the UE may report to the base station that the CSI of Part 2 is not omitted.

Further, the CRI/RI, CQI, and PMI of the reported CSI may be calculated with the codebook defined in the Type I CSI and the calculated CSI may be reported.

In this case, the rank of the CSI may be fixed to a specific reported max rank (for example, rank=2). The reason is that the CSI of Type II targets MU-MIMO and further this is not to change the payload size of the CSI of Part 1.

<Proposal 3>

When the size of the resource allocated by the base station for the CSI reporting is smaller than the size of the payload of the CSI to be reported by the UE, the UE may fix the rank of the CSI to a specific rank and report the rank of the CSI.

Specifically, when the UE is configured as Type II CSI, SB reporting, and PUSCH-based reporting and the payload size of the CSI to be reported is larger than the payload size for the resource allocated for the UCI, the UE may continuously transmit the CSI of Type II in rank 1.

When the UE triggers SB reporting of the CSI of Type II, the base station may allocate sufficient resources to the UE in order to report minimum rank 1.

Therefore, even if a rank appropriate to the CSI reporting is 2, when the size of the reporting container is not large enough, the UE may drop the layer and continuously report the CSI in rank 1.

When the base station indicates such a method to the UE through a specific signal, rank restriction of codebook subset restriction to restrict a subset of the codebook may be adopted.

When the restriction of the rank is indicated to the UE through an implicit method with a non-zero amplitude, a value of a non-zero amplitude corresponding to layer 2 may be set to continuously represent the value of "0".

<Proposal 4>

When the size of the resource allocated by the base station for the CSI reporting is smaller than the size of the payload of the CSI to be reported by the UE, the UE may calculate a specific parameter according to the size of the allocated resource.

Specifically, when the UE is configured as Type II CSI, SB reporting, and PUSCH-based reporting and the payload size of the CSI to be reported is larger than the payload size for the resource allocated for the UCI, the UE may restrict and calculate # of non-zero amplitude coefficient according to the size of the payload for the allocated resource at the time of calculating the CSI of Type II.

The payload of the CSI of Type II may be greatly changed according to a coefficient of a combining beam (L). Since the indicator of # of non-zero amplitude coefficient is together reported through the CSI of Part 1, when the UE calculates the CSI, the value indicted through the indicator may be set according to the size of the configured container.

That is, even though among total (2L-1) WB amplitudes per layer, 2L-1 PMIs are preferably used, when the size of the PMI permitted by the size of the container is a PMI constituted by 2L-3 WB amplitudes, the UE may calculate the PMI according to the value of 2L-3.

In this case, the UE may omit multiple combining coefficients in an order in which the WB amplitude values are smaller and when there are multiple combining coefficients having the same value, the UE may calculate the PMI by omitting the multiple combining coefficients according to an order of a lowest index (or a highest index).

Hereinafter, a case where the UE configured as SB reporting omits the CSI of Part 2 corresponding to specific SB will be described. Here, when the total number of RBs allocated to the UE is $M_{RB}$, SB may be constituted by multiple ($N_{SB}$) RBs and the total number of SBs, Y may be shown in Equation 4 below.

$$Y = \left\lceil \frac{M_{RB}}{N_{SB}} \right\rceil \qquad \text{[Equation 4]}$$

In this case, an index of last RB may be constituted by RBs of a smaller than N. For convenience of description, the description is made by assuming that that the UE is configured Y (=10) SBs and considering a case where W SBs are reported among all Y SBs.

<Proposal 5>

Figure 15:
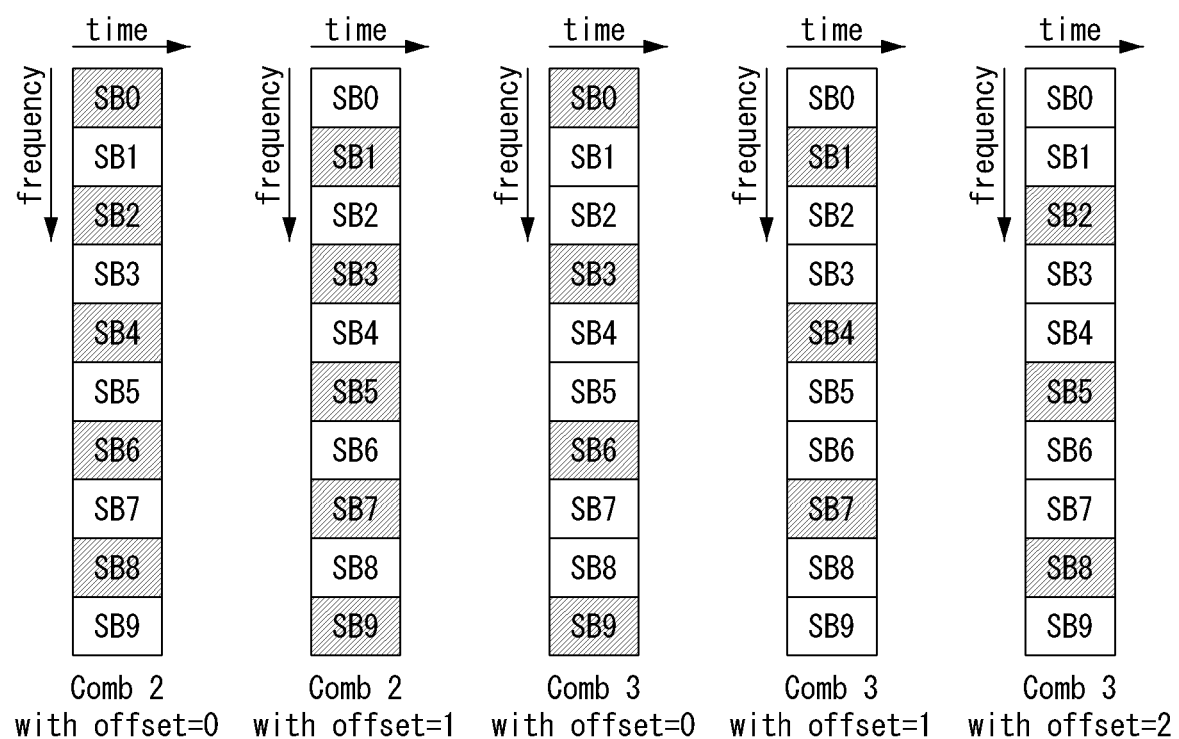
FIG. 15 is a diagram illustrating an example of a method for omitting CSI according to a specific pattern, which is proposed in the present specification.

FIG. 15 is a flowchart illustrating an example of a method for omitting CSI according to a specific pattern, which is proposed in the present specification.

Referring to FIG. 15, when reporting the CSI, the UE may report only a predetermined number of SBs to the base station according to a configured specific pattern.

Specifically, FIG. 15 illustrates an example of a reporting pattern of SB based on specific Comb. The UE may be configured a specific pattern by the base station and may report only some SBs in the CSI of Part 2 according to the configured pattern.

That is, when Comb and the offset value are set by the base station, the UE may report specific SB as the CSI of Part 2 according to the set Comb and offset value.

For example, when Comb 3 and the offset value are set to 0 as illustrated in FIG. 15, the CSI of Part 2 corresponding to SB0, SB3, SB6, and SB9 may be reported.

In the case of Comb 3, since the number of reported SBs may be changed depending on the offset value, it may be configured that a maximum value W (W=4 in FIG. 15) of the number of reported SB is continuously reported according to the offset.

When an offset value in which SBs of a smaller number than W may be reported is used, a predetermined number of SBs are configured to be continuously reported from specific SB (for example, "Z" from SB having a largest index or "Z" from SB having a lowest index), and as a result, a predetermined number of SB may be configured to be reported regardless of the offset value.

For example, in the case of a pattern of Comb 3 of FIG. 15, a specific pattern may be configured to continuously include SB 9 or SB 0.

A specific value and an offset value for determining the SB to be reported or the SB to be omitted by using the specific pattern may be set through the higher layer (for example, RRC, MAC CE, or DCI).

Alternatively, the UE may feed back the specific pattern to be used and since information on a specific value and/or an offset value for the specific pattern may determine a total payload size of Part 2 CSI, the information may be additionally included in the CSI of Part 1.

Alternatively, in order to prevent additional CSI reporting contents from being generated, CQI corresponding to reported SB of Part 2 among SB CQIs included in the CSI of Part 1 may have an absolute index or another index and may be indicated as a specific state (e.g., meaning "out of range" or "PMI dropping") for notifying a fact that the CQI corresponding to the dropped SB is dropped.

Information on Comb length may be signaled by the base station by a combination of the methods and information on the offset may be included in Part 1 or Part 2 and reported by the UE.

Alternatively, the information on the offset may also be implicitly notified by using SB CQI of Part 1 as described above.

As a method for implicitly notifying a pattern value (e.g., comb length, offset value, and/or specific pattern), an offset value having a largest CQI value may be configured to be selected as compared with CQI values (for example, the largest index, etc.) of specific SBs of corresponding comb patterns.

Alternatively, a value (for example, average) representing values of reported CQIs of respective patterns may be configured to select an offset value having a largest pattern.

<Proposal 6>

FIGS. 16 to 20 are diagrams illustrating an example of a method for omitting CSI according to a specific rate, which is proposed in the present specification.

Referring to FIGS. 16 to 20, when reporting the CSI, the UE may report only a predetermined number of SBs to the base station according to a configured specific ratio.

Specifically, the UE may be configured information related to the ratio related to the SB to be omitted from the SBs of the Part 2 CSI from the base station. In this case, the ratio related to the SB to be omitted may be preconfigured in the UE.

The UE may omit some of the SBs of the Part 2 CSI according to the set ratio and report the CSI to the base station.

Figure 16:
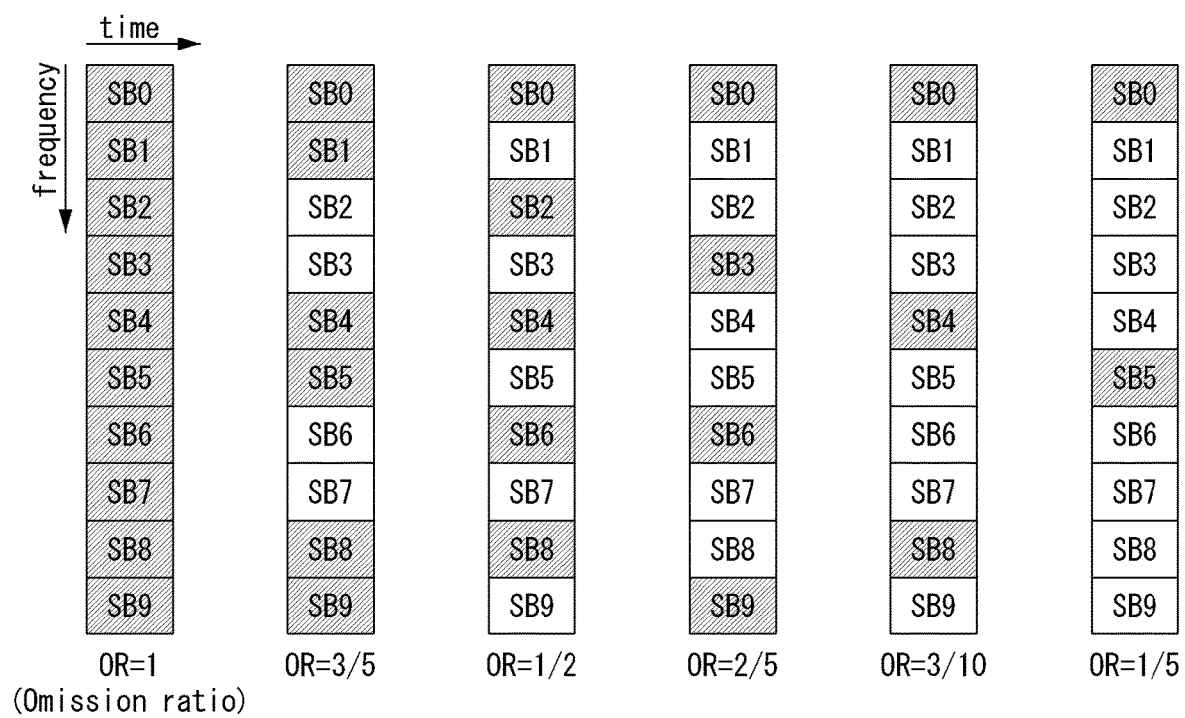
FIGS. 16 to 20 are diagrams illustrating an example of a method for omitting CSI according to a specific rate, which is proposed in the present specification.
Figure 17:
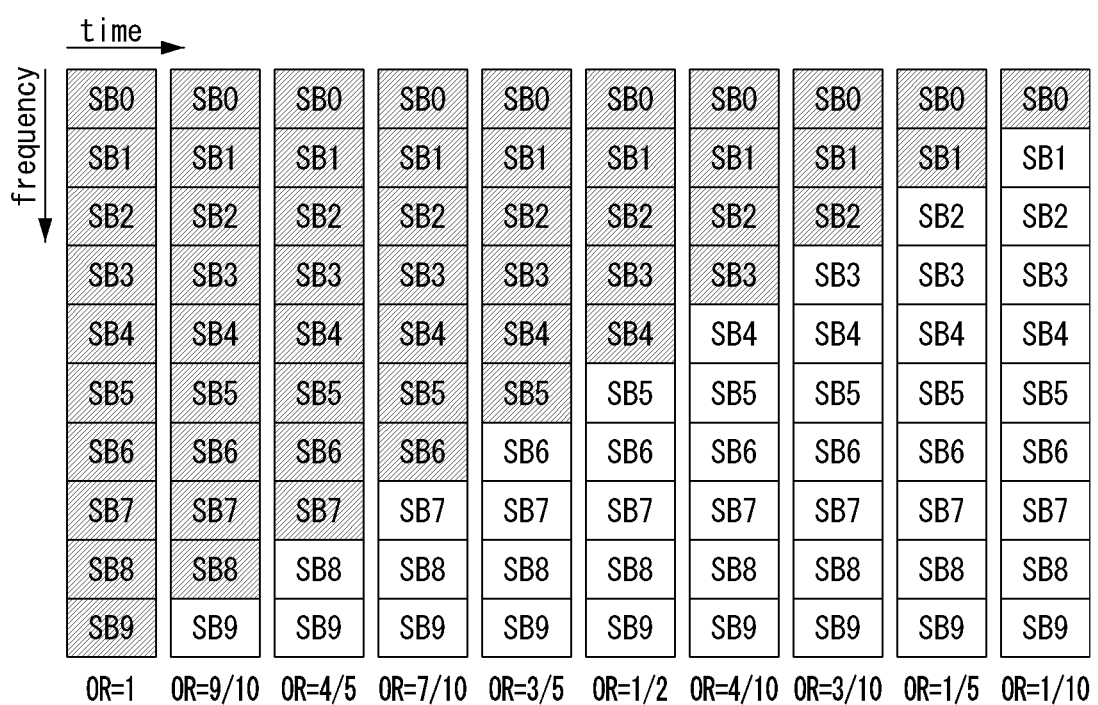

For example, an omission ratio (hereinafter referred to as omission ratio) OR as illustrated in FIGS. 16 and 17 may be expressed by Equation 5 below.

$$OR = W/Y \text{ or } OR = 1 - W/Y \qquad \text{[Equation 5]}$$

A reporting pattern of SB illustrated in FIG. 16 shows an example of a distributed pattern and a reporting pattern of SB illustrated in FIG. 17 shows an example of a localized pattern.

In the case of the distributed pattern, when the base station restores the PMI corresponding to the dropped SB later, an operation such as interpolation for restoration may be easily performed.

The localized pattern may be used when only specific SB reporting is required for a purpose of implementation easiness of the UE and the base station (a purpose for avoiding performance degradation due to erroneous matching when the PMI corresponding to the dropped SB is restored and used) and for use when SB to be scheduled is reserved.

In particular, in the case of a localized SB pattern, the base station may additionally inform the UE of a specific SB as a basis for constructing the localized pattern.

Figure 18:
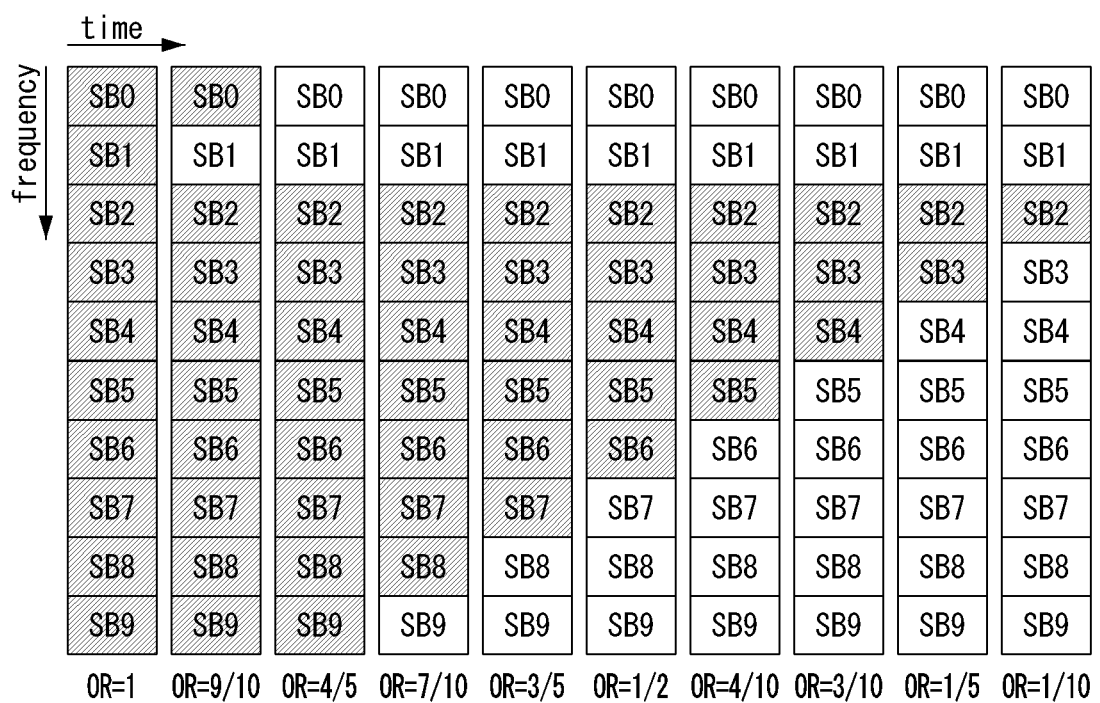
Figure 19:
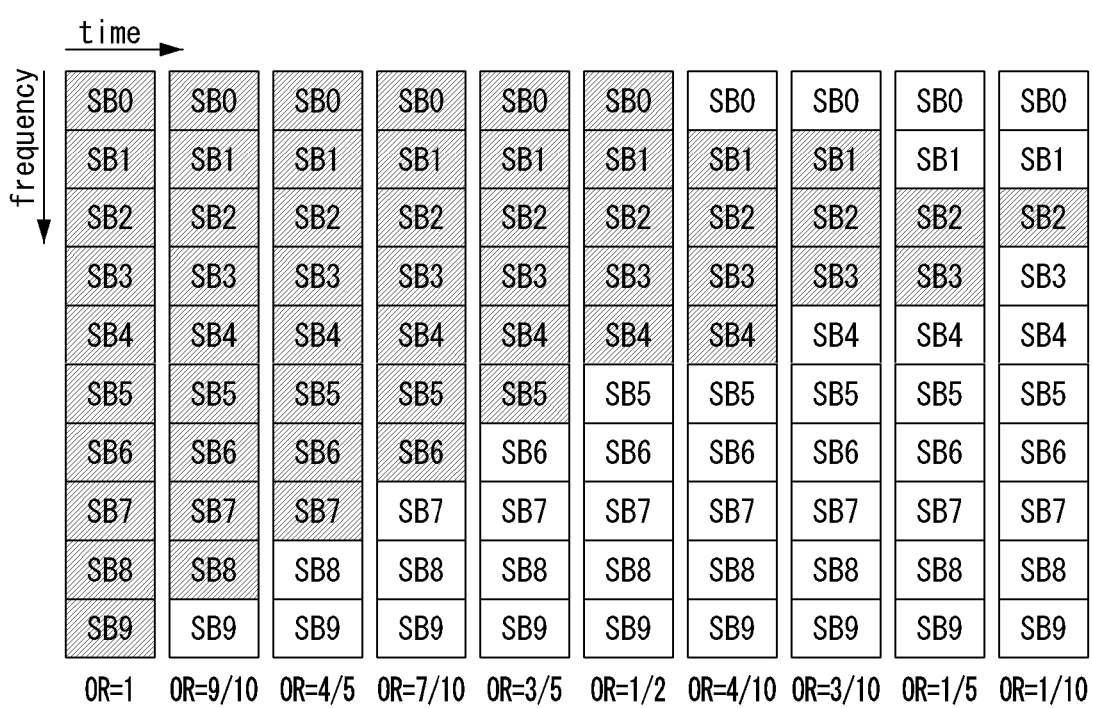

FIG. 17 illustrates an example of configuring the localized pattern based on SB 0 and FIGS. 18 and 19 illustrate an example of the localized pattern based on SB 2.

FIG. 18 illustrate an example of a pattern for determining W SBs based on a specific SB (SB 2) in an order in which the index increases. That is, FIG. 18 illustrates a pattern of decreasing the number of reported SBs by gradually decreasing the value of OR as the index increases based on SB 2.

FIG. 19 illustrates an example of a pattern for setting the number of SBs reported SBs of approximately (W/2-1) SBs based on a specific SB (SB 2).

Information regarding the OR value indicating the ratio at which the SB is omitted (or the ratio of reported SBs) and/or a pattern type indicating a type (localized type or distributed type) of pattern affects the entire payload.

Therefore, the OR value and the pattern type information may be reported to be included in the Part 1 CSI or may have an absolute or differential index for the CQI corresponding to the reported SB among the SB CQIs included in the Part 1 CSI and the CQI corresponding to the dropped SB may be indicated as a specific state (e.g., meaning "out of range" or "PMI dropping") for indicating that the SB is dropped.

As another embodiment of the present invention, the base station may inform the UE of an SB explicitly reported by using a Y-bit map through the higher layer signaling in order to configure a more flexible pattern than a case where a predetermined pattern is used.

That is, as another method for representing W SBs to be reported among Y SBs, the SB to be reported to the UE may be indicated with bits shown in Equation 6 below by jointly encoding.

$$\left\lceil \log_2 \binom{Y}{W} \right\rceil \qquad \text{[Equation 6]}$$

Alternatively, in respect to information on the Y-bit map, the UE may transmit the SB to be reported, which includes the Part 1 CSI to the base station or the information on the Y-bit map may have an absolute or differential index for the CQI corresponding to the reported SB among the SB CQIs included in the Part 1 CSI and the CQI corresponding to the dropped SB may be indicated as a specific state (e.g., meaning "out of range" or "PMI dropping") for indicating that the SB is dropped.

As yet another embodiment of the present invention, the base station may indicate the number information on the number of SBs to be reported to the UE using a specific bit as shown in Equation 7.

$$\lceil \log_2 W \rceil \quad \text{[Equation 7]}$$

In this case, when the size of the CSI to be reported by the UE is larger than the size of the payload corresponding to the resource allocated by the base station, the base station may predict that the PMI for best M SBs among reported SB CQIs is reported and decode the Part 2 CSI.

Alternatively, the reported SBs may be selected as a specific pattern (for example, M-1 patterns select an SB of which index increases) based on the best SB CQI, etc.

When there are multiple same SB CQI values, the SB may be selected and reported in an order according to a specific rule (for example, a lowest index order).

Alternatively, the UE reports the Part 1 CSI including a value of W indicating the number of selected SBs to remove ambiguity for the entire payload size. In this case, the selected SB may be selected according to the methods described above.

<Proposal 7>

In the case of a distributed omission pattern for omitting the SB, a predetermined SB may be omitted according to a specific equation.

Specifically, a distributed uniform dropping (or reported) SB pattern may be defined by Equation 8 below.

$$\left\lfloor \frac{Y}{W} i \right\rfloor + o \quad \text{[Equation 8]}$$

In Equation 8, i=0, 1 . . . W-1 and o which is the offset value is $$0, 1, \ldots \left\lfloor \frac{Y}{W} \right\rfloor,$$

Y represents the number of configured SBs, and W represents the number of reported SBs.

Figure 20:
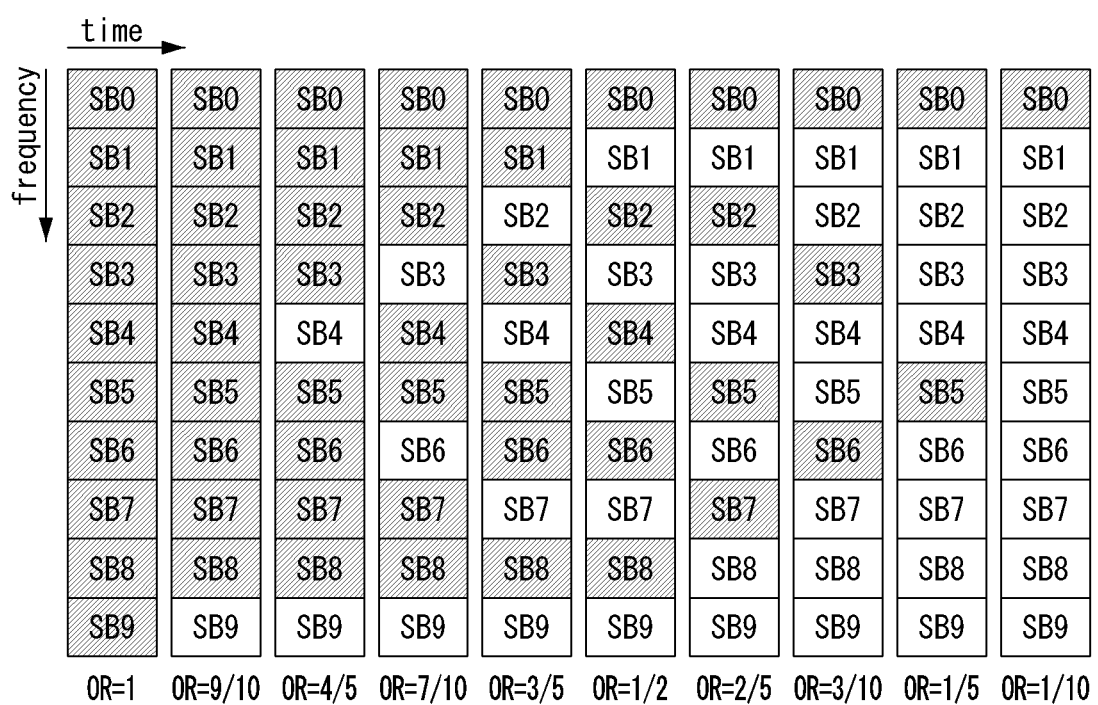

FIG. 20 illustrates an example of the pattern according to Equation 5 and in this case, Y is 10 and o which is the offset value is fixed to "0". The W value and/or the offset value may be additionally reported to the base station in consideration of the CQI or the like by the UE or may be set to a predetermined value in advance.

Alternatively, the base station may instruct the UE through the higher layer signaling. When a uniformly distributed pattern illustrated in FIG. 20 is defined based on the specific SB other than the offset value by Equation 5, a changed equation is shown in an equation below.

$$\mathrm{mod}\!\left(\left\lfloor \frac{Y}{W} i \right\rfloor + o, Y\right) \quad \text{[Equation 9]}$$

where offset o is defined as o=0, 1, . . . , Y-1

Even in the case of the pattern by Equation 9, the W value and/or the offset value may be additionally reported to the base station in consideration of the CQI or the like by the UE or may be set to a predetermined value in advance.

Alternatively, the base station may instruct the UE through the higher layer signaling. Since information additionally fed back by the UE, in particular, the number W of SBs affects the payload of the Part 2 CSI, the number W may be included in the Part 1 CSI.

Alternatively, when a specific OR value (or a specific pattern) is set in advance, pattern information indicating a pattern to be used may be included in the Part 1 CSI.

When the specific SB is omitted through the specific pattern described in Proposals 5 to 7 and the CSI is reported, the base station may estimate the SB that is not reported. When the pattern described in Proposals 5 to 7 is used, the CQI of the SB may be calculated and reported by two following methods.

First, only the CQI corresponding to the reported PMI may be reported.

Second, CQIs for all CQIs are reported and in this case, the CQI of the SB which is not reported may be calculated by using the PMI of the SB corresponding to an index which is least in index difference among the reported SBs.

Alternatively, the CQI of the SB which is not reported through the PMI of the SB corresponding to a largest (that is, closest) index among the indexes of the reported SB while being smaller than the index of the omitted SB.

Alternatively, the CQI of the SB which is not reported through the PMI of the SB corresponding to a largest (that is, closest) index among the indexes of the reported SB while being smaller than the index of the omitted SB.

Alternatively, when the WB PMI described in Proposal 1 is reported, the CQI of the omitted SB may be calculated by the WB PMI.

Which pattern is to be used among all patterns or subsets described in Proposals 5 to 7 may be configured by the base station or additionally reported to the base station by the UE.

When the specific pattern is configured by the base station, the base station may jointly encode the CSI request field with other information and dynamically inform the UE, as shown in Table 10 below.

TABLE 10

| Value of CSI request field | Description |
|---|---|
| '00' | No aperiodic CSI report is triggered |
| '01' | Aperiodic CSI report is triggered for serving cell $c$ |
| '10' | OR = 1/2 |
| '11' | OR = 3/10 |

Table 10 shows a pattern in which states of '01' and '11' are configured in a 2-bit DCI field. That is, the OR value may be indicated by a specific value of the CSI request field and a specific pattern for the CSI reporting may be configured based on the indicated OR value.

Such a value is just an example and the patterns described in Proposals 5 to 7 may be configured according to the CSI request field or a specific parameter value or indicator may be used to configure the patterns described in Proposals 5 to 7.

In this case, it is possible to dynamically allocate the resource of the base station considering the payload, i.e., uplink traffic.

<Proposal 8>

The pattern in which the SB is omitted may be determined in the following method according to the reported SB CQI.

First, the Part 2 CSI of the SB corresponding to a value which is equal to or less than a specific threshold value (for example, SB CQI threshold value) which the base station indicates to the UE in advance may be omitted.

Second, the number W of SBs which the base station is to report to the UE in advance may be indicated. In this case, the UE may calculate the CQI and the PMI for each SB and report the Part 2 CSI only to the SB corresponding to a predetermined number (for example, best W) among them.

Alternatively, a pattern may be determined in which the SB is omitted by a combination of first and second methods.

<Proposal 9>

The SB PMI corresponding to the dropped or omitted SB may be restored based on the reported SB PMIs, and for this, the UE may report additional information (e.g., a coefficient used when performing interpolation or extrapolation) to the base station.

For example, when a pattern of Comb 2, offset=0 illustrated in FIG. 15, odd SB may be restored by interpolation of a plurality of even SBs adjacent to each other.

For example, when the SB PMI of SB_(2i+1) where i=0, 1, 2, ... is represented by $v_{2i+1}$, the SB PMI may be restored to $v_{2i+1} = w_{2i} v_{2i} + w_{2i+2} v_{2i+2}$. In this case, weighting coefficient(s) $\{w_{2i}\}$ may be set to a specific value $$\left(e.g., \frac{1}{\sqrt{2}}\right)$$

or the UE may additionally report the specific value to the base station.

<Proposal 10>

For the SB PMI corresponding to the dropped or omitted SB, the WB PMI is additionally reported and the PMI of the dropped or omitted SB may be replaced with the WB PMI or a SB PMI corrected using the WB PMI may be used.

In Proposal 10, the SB CQI reported in the Part 1 CSI may use a CQI value using the calculated SB PMI by assuming that the dropped SB is reported.

Alternatively, the dropped SB may be replaced with the WB CQI or the SB CQI may also be dropped.

Additionally, the method for estimating the SB PMI by using the WB PMI may be estimated by using the method described in Proposal 9.

For example, $v_{2i+1} = w_{WB} v_{WB} + w_{2i} v_{2i}$ where $w^2_{WB} + w^2_{2i} + w^2_{2i+2} = 1$ and a subscript WB represents information corresponding to a wideband PMI. Here, weighting information w may be promised in advance or the UE may additionally report the weighting information to the base station and the base station may estimate or correct the SB PMI to be dropped using this information and use the SB PMI for data transmission.

A rule for omitting some of the CSI may be newly defined by combining all or some of the methods described in Proposals 1 to 10.

<Proposal 11>

When the size of the resource allocated by the base station for the CSI report is smaller than the size of the payload of the CSI to be reported by the UE, the UE may adjust the size of the SB for the CSI without omitting some or all of the CSI.

When the UE is configured as SB reporting and the size of a payload corresponding to the CSI to be transmitted by the UE is larger than the size of a payload corresponding to the resource allocated for the UCI, the UE may report the CSI by adjusting the size of the SB without omitting all or some of CSIs corresponding to the specific SB.

In the case of Proposal 11, the size (for example, 1 SB=6 RBs) of the configured RB may be adjusted according to the size of the payload corresponding to the resource allocated for the UCI.

For example, when 1 SB is set as 6 RBs, 1 SB may be set as 12 RBs and transmitted.

Specifically, when $M_{RB}$ is defined as the number of configured RBs and $N_{SB}$ is set as the number of RBs constituting one SB, the number Y of SBs is shown in Equation 10 below.

$$Y = \left\lceil \frac{M_{RB}}{N_{SB}} \right\rceil \quad \text{[Equation 10]}$$

In this case, the size of Y may be changed by a specific element (hereinafter referred to as a resize factor).

For example, the size of Y may be changed as shown in Equation 11 below by resize factor a (for example, a=1, 2, 3, 4).

$$Y = \left\lceil \frac{M_{RB}}{a * N_{SB}} \right\rceil \quad \text{[Equation 11]}$$

The UE may transmit the CSI according to the value of the changed Y.

When the number of RBs constituting SB of which size is explicitly adjusted is notified without using the resize factor, it is preferable to adjust the number of RBs so that the number of RBs becomes integer times of a PRG size by considering the PRG size.

The UE may calculate Part 1 and Part 2 CSIs according to the number of changed SBs and report the calculated CSIs to the base station.

The UE may inform the BS of a change in the number Y of SBs through additional feedback (e.g., a, the size of the resized SB and/or a change indicator indicating that the size of the SB is changed, etc.).

The feedback may have higher priority than the Part 1 and Part 2 CSIs.

Alternatively, the value or the size of the resized SB may be promised in advance by the BS and the UE or may be informed to the UE by the BS through the higher layer signaling.

Proposal 11 may be applied only to a specific rank (e.g., rank=2).

In the case of Proposal 11, a specific SB size may be set as a default value.

For example, the size of eight SBs may be set as the default value for 50 RBs, and the base station may inform the UE of a resized value or a different value (e.g., 4) through the higher layer signaling.

Alternatively, the SB size may be set according to the configured CSI type.

For example, it may be promised between the UE and the base station that Type I CSI is set to 8 and Type II CSI is set to 4.

That is, if there are two supported SB sizes, the larger value is continuously used for Type I, single CC, single link, and/or single BWP reporting, and the smaller SB size may be continuously used for Type II.

<Proposal 11-1>

When the UE is configured as SB reporting and the size of a payload corresponding to the CSI to be reported by the UE is larger than the size of a payload for the resource allocated for the UCI, the UE may report SB group-wise CSI configured by SB grouping through a specific scheme.

For example, even if 10 SBs are set, the CSI reporting may report the CSI corresponding to the representative SB of the group That is, when {SB0, SB1}, {SB2, SB3} ..., {SB8, SB9} are grouped into one group by binding two SBs, the SBs corresponding to even number (or odd number) ma be configured as the representative SB of the group.

The UE may report the PMI corresponding to the SB configured as the representative SB to the base station.

The SB CQI is calculated based on the PMIs, so that all SB CQIs may be reported or only CQI corresponding to the representative SB may be reported.

When all SB CQIs are reported, the SB CQIs of the SBs excluding the representative SB in the group may be calculated based on the PMI of the representative SB.

The group representative SB may be configured between the UE and the base station in advance or configured by the base station.

Alternatively, the UE may configure the group representative SB based on the best CQI, etc., and additionally report this information to the base station. This information does not affect the payload and thus may be reported while being included in the Part 2 CSI.

FIGS. 21 to 22 are diagrams illustrating an example of a method for omitting CSI according to a priority, which is proposed in the present specification.

Referring to FIGS. 21 and 22, the priorities of WBs and SBs of Parts 1 and 2 may be configured and when the size of the resource (or coding rate) allocated for the UCI by the base station is smaller than the size (or coding rate) of the CSI to be reported by the UE, the SB and/or WB may be omitted according to the configured priority.

Hereinafter, the omission method for reporting the CSI according to the priority will be described in detail.

<Proposal 12>

By carrier aggregation, when the entire CSI payload exceeds the container size, the SB of the Part 2 CSI may be omitted by the methods described in Proposals 1 to 11 in an order in which a cc index is higher.

If CC index 0 indicates a P-cell, the CSI corresponding to the P-cell always has the highest priority to transmit the full CSI.

When the full CSI for the P-cell is not also transmitted by the container, some or all of the CSI may be omitted according to the omission methods described in Proposals 1 to 11.

When the full CSI of the P-cell may be transmitted but full CSI of all CCs may not reported, Part 2 CSI→Part 1 CSI may be dropped in order of high cc index.

In this case, Part 2 CSI may be omitted according to the omission methods described in Proposals 1 to 11.

For example, when the number of CCs is 5, the omission order may be Part 2 CSI of CC index 4→Part 1 CSI of CC index 4→Part 2 CSI of CC index 3→Part 1 CSI of CC index 3 CSI ...

As another method, when RI or CQI information included in the Part 1 CSI is required with respect to each CC, in the method (hereinafter referred to as a dropping rule) for omitting the CSI, the CSI may be omitted in order of Part 2 CSI of CC index 4→Part 2 CSI of CC index 3→Part 2 CSI of CC index 2 ... →Part 1 CSI of CC index 4, ...

Even in this case, CC index 0 needs to be continuously transmitted with full CSI.

When fixed with a specific omission pattern, for example, using comb-$2_{WB}$, the specific offset (0 or 1) may be first omitted, which may be expressed as follows.

When there are N (0 to N-1) CCs to be reported in the same slot, the CSI may be dropped (or omitted) in order of Part 2 CSI with offset 1 (i.e., odd comb) of CC index (N-1)→Part 2 CSI with offset 1 (i.e., odd comb) of CC index (N-2) ... →Part 2 CSI with offset 1 (i.e., odd comb) of CC index 0→Part 2 CSI with offset 0 (i.e., even comb) of CC index (N-1) ..., Part 2 CSI with offset 0 (i.e., even comb) of CC index 0.

In this case, Part 1 CSI may be continuously reported. When a length of comb increases, the Part 1 CSI may be expanded and applied by a method in which the CSI is omitted in a specific order (e.g., in order of decreasing order of offset).

Part 2 CSI may be divided into WB CSI and SB CSI, WB CSI may have a higher priority than SB CSI, and WB CSI may be omitted last.

For example, a CSI when the CSI corresponding to another offset other than offset 0 is omitted may be a SB CSI.

In this case, the CSI of the SB corresponding to offset 0 may be set to WB CSI+SB CSI, or the highest priority for WB CSI and/or Part 1 CSI may be set.

<Proposal 13>

When the UE is configured as multiple BWP (bandwidth part) and the entire CSI payload exceeds the container size, the dropping rule described in Proposals 1 to 11 may be applied in order of increasing (or decreasing) a BWP index.

When the UE is configured as multiple BWPs and may not report all the CSIs corresponding to the entire configured BWPs, the CSI may be omitted in order of higher (or lower) BWP index.

For example, when three BWPs (BWP0, BWP1, and BWP2) are configured in the UE and omitted in order of higher index, examples of the omitted CSI are as follows.

The CSI may be omitted in order of part 2 CSI of BWP2→part 1 CSI of BWP2→part 2 CSI of BWP1→part 1 CSI of BWP1 ....

As another example of the present invention, when the RI or CQI information included in the part 1 CSI is required with respect to each BWP, according to the dropping rule, the CSI may be omitted in order of part 2 CSI of BWP2→part 2 CSI of BWP1→part 2 CSI of BWP0 2→part 1 CSI of BWP2 ....

In such a method, when more importance is given to a specific BWP (e.g., BWP0 if configured by the base station), the full CSI is transmitted for BWP0 and the dropping rule defined in Proposals 1 to 11 may be applied for the remaining BWPs.

When the omitted CSI is fixed to a specific omission pattern, for example, a pattern of comb-2 illustrated in FIG. 15 is used, the specific offset value (0 or 1) may be first omitted as follows.

That is, if there are N (0 to N-1) BWPs to be reported in the same slot, the CSI may be omitted in order of part 2 CSI with offset 1 (i.e., odd comb) of BWP index (N-1)→part 2 CSI with offset 1 (i.e., odd comb) of BWP index (N-2) ... →part 2 CSI with offset 1 (i.e., odd comb) of BWP index 0→part 2 CSI with offset 0 (i.e., even comb) of BWP index (N-1) ..., part 2 CSI with offset 0 (i.e., even comb) of BWP index 0.

In such a method, it may be assumed that the part 1 CSI is continuously reported.

If the length of the comb increases, the omission of the CSI is set according to a specific order (e.g., in order of decreasing an offset value) to be expanded and applied.

The part 2 CSI may be divided into a WB CSI and a SB CSI, and the WB CSI may have a higher priority than the SB CSI. For this purpose, the WB CSI may be set to be omitted at the latest.

For example, a CSI when the CSI corresponding to another offset other than an offset value of 0 is omitted is a SB CSI, and the CSI of the SB corresponding to the offset 0 may be set to WB CSI+SB CSI, or the highest priority for the WB CSI may be set.

The priority of the part 1 and part 2 CSIs illustrated in FIGS. 21 and 22 may be applied by replacing a CC index with a BWP index.

<Proposal 14>

When multiple CSIs are defined by an environment such as CoMP, etc. and the entire CSI payload exceeds the container size, the defined dropping rule described in Proposals 1 to 11 may be applied in order of higher CSI process index.

Similarly to the method described in Proposal 11, when the Full CSI may not be reported, the CSI may be omitted in order of part 2 CSI→part 1 CSI in order of higher CSI process index.

In this case, in the part 2 CSI, SBs of the part 2 may be omitted according to the dropping rule described in Proposals 1 to 11.

For example, if the number of CSI processes is 3, in the omission order according to the dropping rule, the CSI may be omitted in order of part 2 CSI of CSI process index 2→part 1 CSI of CSI process index 2→part 2 CSI of CSI process index→part 1 CSI of CSI process index 2.

As another embodiment of the present invention, when RI or CQI information included in the part 1 CSI is required with respect to each CSI process, according to the dropping rule, the CSI may be omitted in order of part 2 CSI of CSI process index 3→part 2 CSI of CSI process index 3→part 2 CSI of CSI process index 0→part 1 CSI of CSI process index 2.

When such a method is applied to a system that does not have the concept of CSI process such as NR, the dropping rule may be applied as follows.

For example, when one CSI reporting setting is connected to a plurality of CSI-RS resource settings for channel measurement, priority may be set according to a resource setting ID or link ID to apply the dropping rule described above.

Here, the priority may be set by an indicator indicating the priority in advance or the lowest ID may be set in advance to have high priority.

Alternatively, the indicator for the priority may be separately set in the resource setting or link.

As yet another embodiment of the present invention, when multiple CSI reporting settings are triggered at the same time, the priority may be set according to the reporting setting ID (for example, lowest ID index), or a separate priority indicator may be set in the reporting setting.

As still another embodiment of the present invention, similarly to the Pcell of carrier aggregation, when there is a link/CSI process which needs to report the full CSI because of high importance (the information may be set to a specific link/CSI process ID in advance or configured by a higher layer), the link/CSI process has a higher priority than other links, and CSI omission on the link/CSI process except for the specific link/CSI process may be first performed.

As still yet another embodiment of the present invention, when the omitted CSI is fixed to the specific omission pattern described in FIGS. 15 to 20, for example, the comb-2 illustrated in FIG. 15 is used, a specific offset vale (e.g., 0 or 1) may be first omitted as follows.

That is, in the example, if there are N (0 to N-1) link/CSI processes to be reported in the same slot, the CSI may be omitted in order of part 2 CSI with offset 1 (i.e., odd comb) of link/CSI process index (N-1)→part 2 CSI with offset 1 (i.e., odd comb) of link/CSI process index (N-2) . . . →part 2 CSI with offset 1 (i.e., odd comb) of link/CSI process index 0→part 2 CSI with offset 0 (i.e., even comb) of link/CSI process index (N-1) . . . , →part 2 CSI with offset 0 (i.e., even comb) of link/CSI process index 0.

At this time, the part 1 CSI may be continuously reported. If the length of the comb increases, the omission of the CSI is set according to a specific order (e.g., in order of decreasing an offset value) to be expanded and applied.

The part 2 CSI may be divided into a WB CSI and a SB CSI, and the WB CSI has a higher priority than the SB CSI.

For this purpose, the WB CSI may be set to be omitted at the latest. For example, a CSI when the CSI corresponding to another offset other than offset 0 is omitted is a SB CSI, and the CSI of the SB corresponding to the offset value of 0 may be set to WB CSI+SB CSI, or the highest priority for the WB CSI may be set.

The priority of the part 1 and part 2 CSIs illustrated in FIGS. 21 and 22 may be applied by replacing a CC index with a link/CSI process index.

The Cc index may have a higher priority than the BWP index and the BWP index may have a higher priority than the link/CSI process.

The base station may inform the UE of the priority through higher layer signaling.

Overview of Devices to which Present Invention is Applicable

Figure 23:
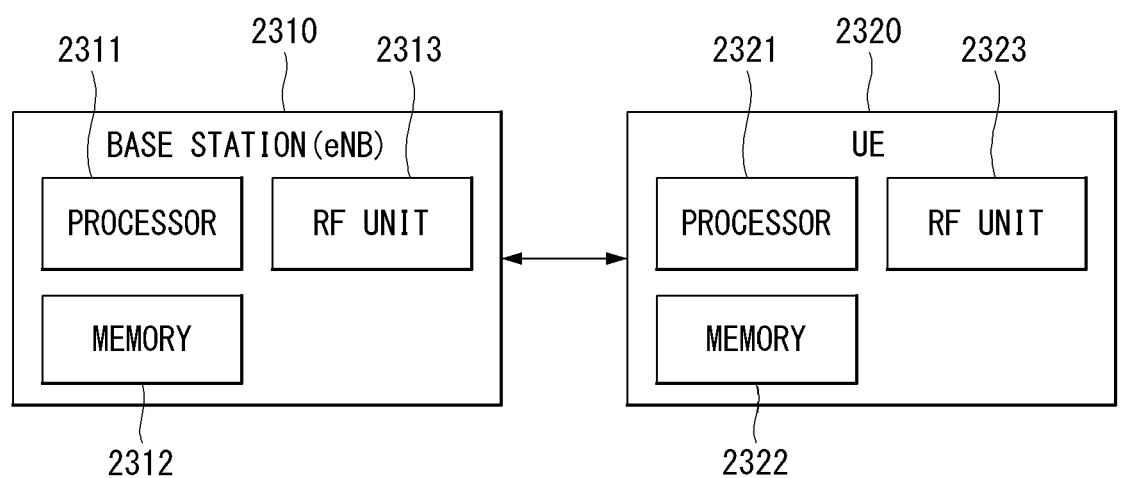
FIG. 23 illustrates a block diagram of a wireless communication device to which methods proposed in the present specification may be applied.

FIG. 23 illustrates a block diagram of a wireless communication device to which methods proposed in the present specification may be applied.

Referring to FIG. 23, a wireless communication system includes a BS 2310 and multiple UEs 2310 positioned within an area of the BS 2320.

Each of the BS and the UE may be expressed as a wireless device.

The BS 2310 includes a processor 2311, a memory 2312, and a radio frequency (RF) module 2313. The processor 2311 implements a function, a process, and/or a method which are proposed in FIGS. 1 to 22 above. Layers of a radio interface protocol may be implemented by the processor. The memory 2312 is connected with the processor to store various information for driving the processor. The RF module 2313 is connected with the processor to transmit and/or receive a radio signal.

The UE 2320 includes a processor 2321, a memory 2322, and an RF module 2323.

The processor 2321 implements a function, a process, and/or a method which are proposed in FIGS. 1 to 22 above. Layers of a radio interface protocol may be implemented by the processor. The memory 2322 is connected with the processor to store various information for driving the processor. The RF module 2323 is connected with the processor to transmit and/or receive a radio signal.

The memories 2312 and 2322 may be positioned inside or outside the processors 2311 and 2321 and connected with the processors 2311 and 2321 by various well-known means.

Further, the base station 2310 and/or the UE 2320 may have a single antenna or multiple antennas.

Figure 24:
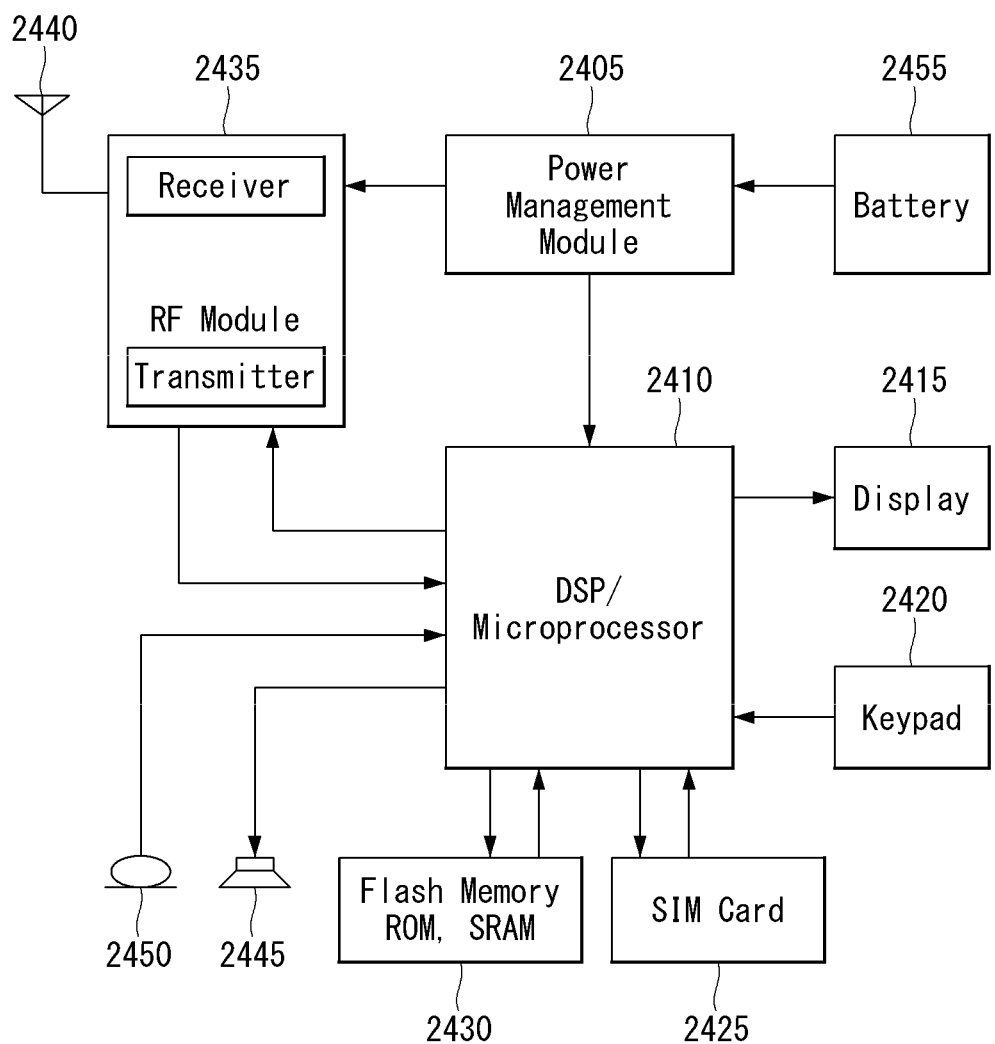
FIG. 24 illustrates a block diagram of a communication device according to an embodiment of the present invention.

FIG. 24 illustrates a block diagram of a communication device according to an embodiment of the present invention.

In particular, FIG. 24 is a diagram more specifically illustrating the UE of FIG. 23 above.

Referring to FIG. 24, the UE may be configured to include a processor (or a digital signal processor (DSP) 2410, an RF module (or RF unit) 2435, a power management module 2405, an antenna 2440, a battery 2455, a display 2415, a keypad 2420, a memory 2430, a subscriber identification module (SIM) card 2425 (This component is optional), a speaker 2445, and a microphone 2450. The UE may also include a single antenna or multiple antennas.

The processor 2410 implements a function, a process, and/or a method which are proposed in FIGS. 1 to 23 above. Layers of a radio interface protocol may be implemented by the processor.

The memory 2430 is connected with the processor and stores information related with an operation of the processor. The memory 2430 may be positioned inside or outside the processor and connected with the processor by various well-known means.

A user inputs command information such as a telephone number or the like by, for example, pressing (or touching) a button on the keypad 2420 or by voice activation using the microphone 2450. The processor receives such command information and processes to perform appropriate functions including dialing a telephone number. Operational data may be extracted from the SIM card 2425 or the memory 2430. In addition, the processor may display command information or drive information on the display 2415 for the user to recognize and for convenience.

The RF module 2435 is connected with the processor to transmit and/or receive an RF signal. The processor transfers the command information to the RF module to initiate communication, for example, to transmit radio signals constituting voice communication data. The RF module is constituted by a receiver and a transmitter for receiving and transmitting the radio signals. The antenna 2440 functions to transmit and receive the radio signals. Upon receiving the radio signals, the RF module may transfer the signal for processing by the processor and convert the signal to a baseband. The processed signal may be converted into to audible or readable information output via the speaker 2445.

Figure 25:
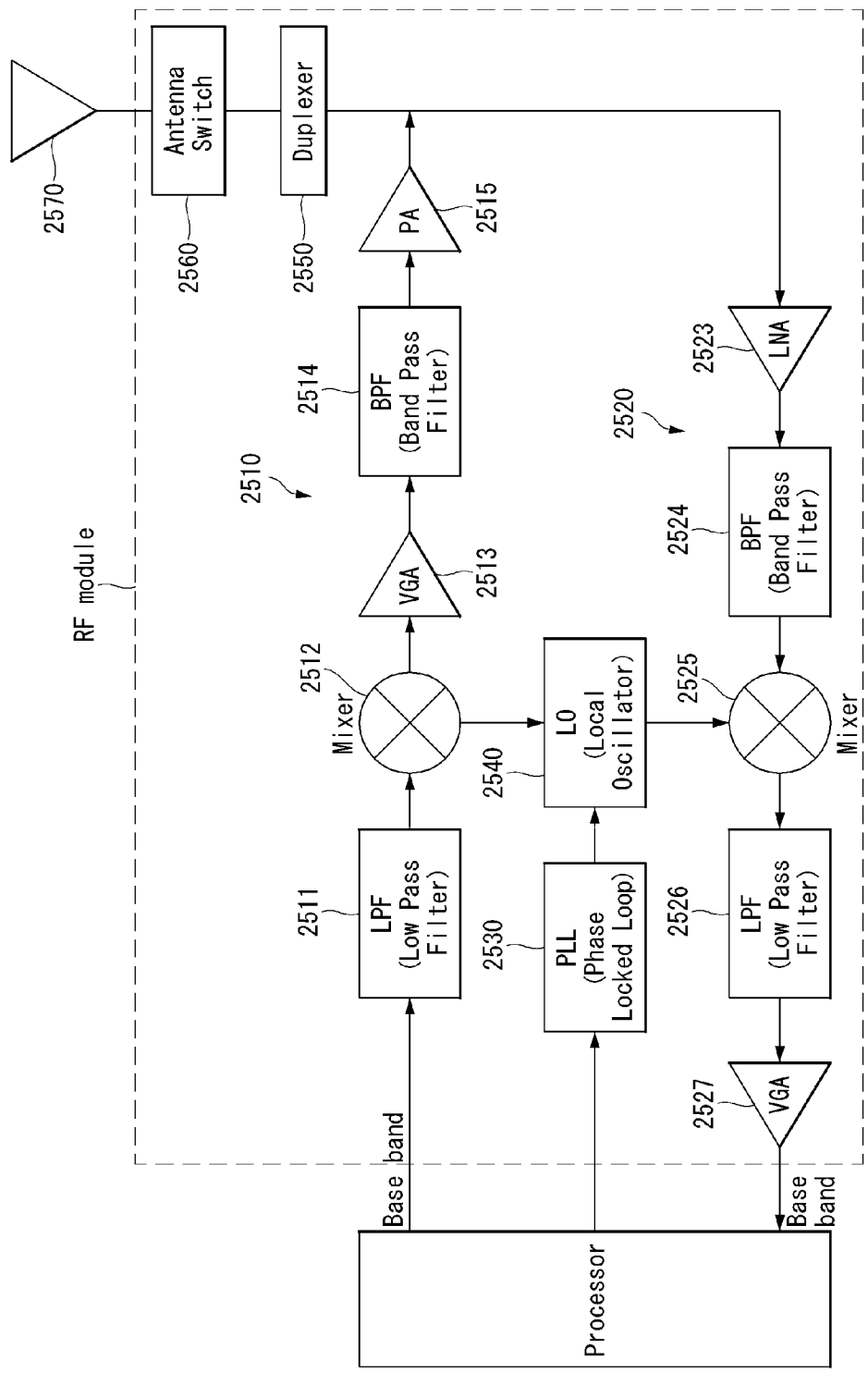
FIG. 25 is a diagram illustrating an example of an RF module of the wireless communication device to which the method proposed in the present specification may be applied.

FIG. 25 is a diagram illustrating an example of an RF module of the wireless communication device to which the method proposed in the present specification may be applied.

Specifically, FIG. 25 illustrates an example of an RF module that may be implemented in a frequency division duplex (FDD) system.

First, in a transmission path, the processors described in FIGS. 24 and 25 process the data to be transmitted and provide an analog output signal to the transmitter 2510.

Within the transmitter 2510, the analog output signal is filtered by a low pass filter (LPF) 2511 to remove images caused by a digital-to-analog conversion (ADC) and up-converted to an RF from a baseband by an up-converter (mixer) 2512, and amplified by a variable gain amplifier (VGA) 2513 and the amplified signal is filtered by a filter 2514, additionally amplified by a power amplifier (PA) 2515, routed through a duplexer(s) 2550/an antenna switch(es) 2560, and transmitted through an antenna 2570.

In addition, in a reception path, the antenna 2570 receives signals from the outside and provides the received signals, which are routed through the antenna switch(es) 2560/ duplexers 2550 and provided to a receiver 2520.

In the receiver 2520, the received signals are amplified by a low noise amplifier (LNA) 2523, filtered by a bans pass filter 2524, and down-converted from the RF to the baseband by a down-converter (mixer) 2525.

The down-converted signal is filtered by a low pass filter (LPF) 2526 and amplified by a VGA 2527 to obtain an analog input signal, which is provided to the processors described in FIGS. 23 and 24.

Further, a local oscillator (LO) generator 2540 also provides transmitted and received LO signals to the up-converter 2512 and the down-converter 2525, respectively.

In addition, a phase locked loop (PLL) 2530 receives control information from the processor to generate the transmitted and received LO signals at appropriate frequencies and provides control signals to the LO generator 2540.

Further, circuits illustrated in FIG. 25 may be arranged differently from the components illustrated in FIG. 25.

Figure 26:
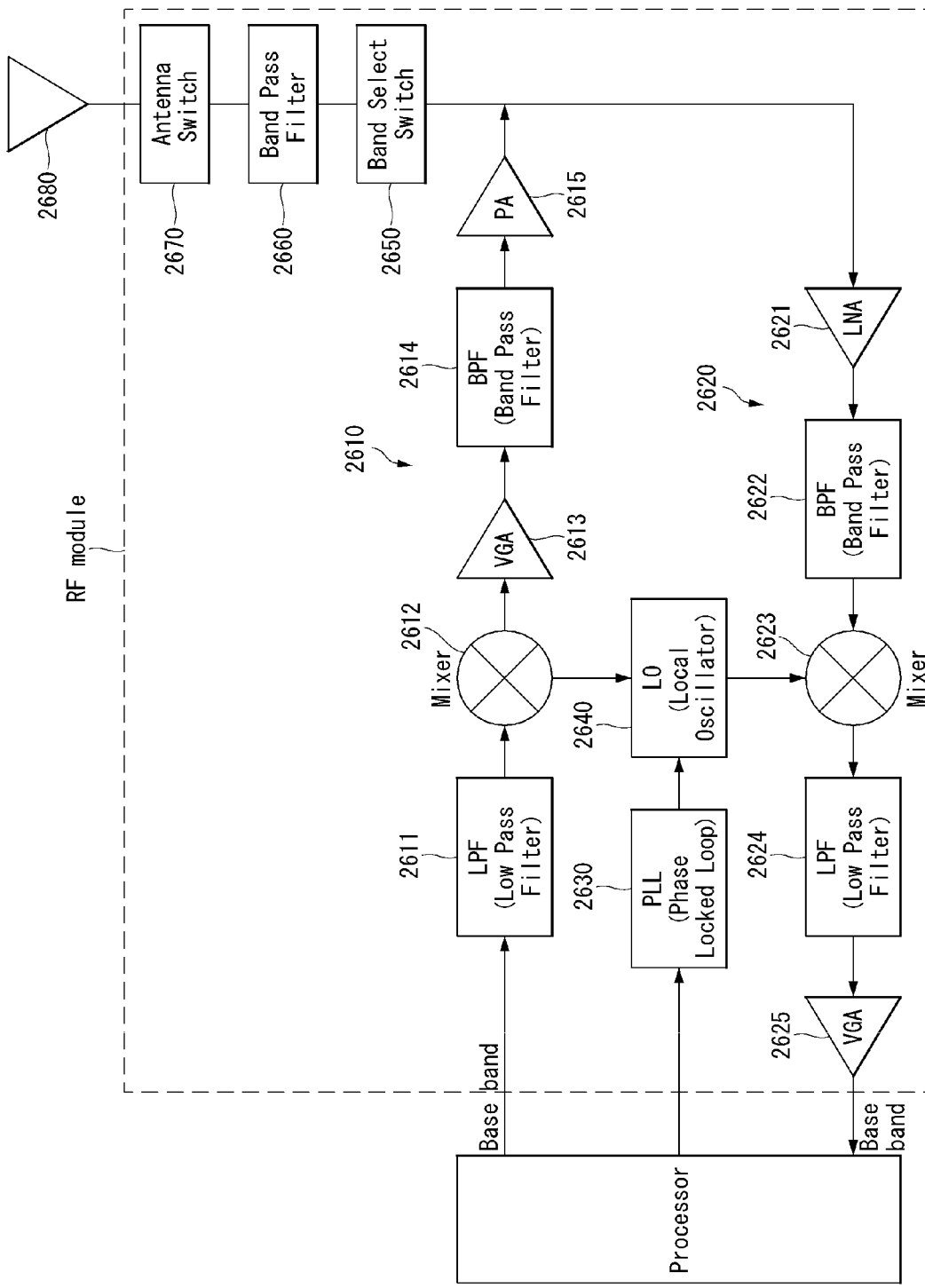
FIG. 26 is a diagram illustrating another example of the RF module of the wireless communication device to which the method proposed in the present specification may be applied.

FIG. 26 is a diagram illustrating another example of the RF module of the wireless communication device to which the method proposed in the present specification may be applied.

Specifically, FIG. 26 illustrates an example of an RF module that may be implemented in a time division duplex (TDD) system.

A transmitter 2610 and a receiver 2620 of the RF module in the TDD system are identical in structure to the transmitter and the receiver of the RF module in the FDD system.

Hereinafter, only the structure of the RF module of the TDD system that differs from the RF module of the FDD system will be described and the same structure will be described with reference to a description of FIG. 25.

A signal amplified by a power amplifier (PA) 2615 of the transmitter is routed through a band select switch 2650, a band pass filter (BPF) 2660, and an antenna switch(es) 2670 and transmitted via an antenna 2680.

In addition, in a reception path, the antenna 2680 receives signals from the outside and provides the received signals, which are routed through the antenna switch(es) 2670, the band pass filter 2660, and the band select switch 2650 and provided to the receiver 2620.

In the embodiments described above, the components and the features of the present invention are combined in a predetermined form. Each component or feature should be considered as an option unless otherwise expressly stated. Each component or feature may be implemented not to be associated with other components or features. Further, the embodiment of the present invention may be configured by associating some components and/or features. The order of the operations described in the embodiments of the present invention may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present invention may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present invention may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present invention may be embodied in other specific forms without departing from essential characteristics of the present invention. Accordingly, the aforementioned detailed description should not be construed as restrictive in all terms and should be exemplarily considered. The scope of the present invention should be determined by rational construing of the appended claims and all modifications within an equivalent scope of the present invention are included in the scope of the present invention.

What is claimed is:

1. A method of reporting, by a user equipment, channel state information (CSI) in a wireless communication system, the method comprising:
receiving configuration information related to reporting of the CSI from a base station,
wherein the configuration information includes parameters related to omission of the CSI, and
wherein the CSI comprises (i) a first part used to identify a number of information bits of a second part of the CSI and (ii) the second part;
receiving downlink control information(DCI) including information regarding a coding rate of the CSI from the base station;
receiving a first reference signal for channel measurement;
measuring a channel based on the first reference signal; and
reporting the CSI of the measured channel through a physical uplink shared channel (PUSCH) to the base station,
wherein the second part of the CSI includes a wideband CSI and a subband CSI,
wherein the wideband CSI included in the second part of the CSI has a higher priority than the subband CSI included in the second part of the CSI,
wherein some or all of the second part of the CSI is omitted based on a coding rate of the second part being greater than a threshold value, and
wherein the threshold value is based on at least one of (i) the DCI or (ii) the parameters related to omission of the CSI.

2. The method of claim 1, wherein the some or all of the second part is omitted until the threshold value and the coding rate of the second part of the CSI are the same as each other.

3. The method of claim 1, wherein the subband CSI included in the second part of the CSI is constituted by a plurality of subbands,
wherein subbands in the plurality of subbands are omitted based on a priority of each of the plurality of subbands, and
wherein the some or all of the second part is omitted without omitting the first part of the CSI.

4. The method of claim 3, wherein the subbands in the plurality of subbands are omitted according to an order of lower priority.

5. The method of claim 4, wherein the DCI includes at least one of pattern information, omission rate information, or specific subband information related with an omitted subband among the plurality of subbands constituting the second part.

6. The method of claim 5, wherein the pattern information includes an offset value and a Comb value representing a pattern of the omitted subband.

7. The method of claim 1, wherein the first part includes a rank indicator (RI), a channel quality indicator (CQI), and an indicator indicating a number of beams having an amplitude other than 0, and
wherein the second part includes a precoding matrix indicator (PMI).

8. The method of claim 1, further comprising:
transmitting, to the base station, additional information for restoring subband precoding matrix indicator(PMI)s corresponding to the omitted some of the second part of the CSI,
wherein the subband PMIs corresponding to the omitted some of the second part of the CST is restored based on the additional information and reported subband PMTs corresponding to reported some of the second part of the CSI other than the omitted some of the second part of the CSI.

9. The method of claim 1, wherein an entirety of the first part is transmitted before the second part is transmitted.

10. The method of claim 1, wherein the first part includes a rank indicator (RI) and a channel quality indicator (CQI), and
wherein the second part includes a precoding matrix indicator (PMI).

11. A method of receiving, by a base station, channel state information (CSI) from a user equipment in a wireless communication system, the method comprising:
transmitting configuration information related with reporting of the CSI to the user equipment,
wherein the configuration information includes parameters related to omission of the CSI, and
wherein the CSI comprises (i) a first part used to identify a number of information bits of a second part of the CSI and (ii) the second part;
transmitting downlink control information (DCI) including information regarding a coding rate of the CSI to the user equipment;
transmitting a first reference signal for measuring a channel to the user equipment; and
receiving the CSI of the measured channel through a physical uplink shared channel (PUSCH) from the user equipment,
wherein the second part of the CSI includes a wideband CSI and a subband CSI,
wherein the wideband CSI included in the second part of the CSI has a higher priority than the subband CSI included in the second part of the CSI,
wherein some or all of the second part of the CSI is omitted based on a coding rate of the second part being greater than a threshold value, and
wherein the threshold value is based on at least one of (i) the DCI or (ii) the parameters related to omission of the CSI.

12. The method of claim 11, wherein the some or all of the second part is omitted until the threshold value and the coding rate of the second part of the CSI are the same as each other.

13. The method of claim 11, wherein the second part is constituted by a plurality of subbands, wherein subbands in the plurality of subbands are omitted based on a priority of each of the plurality of subbands, and wherein the some or all of the second part is omitted without omitting the first part of the CSI.

14. The method of claim 13, wherein the subbands in the plurality of subbands are omitted according to an order of lower priority.

15. The method of claim 14, wherein the DCI includes at least one of pattern information, omission rate information, or specific subband information related with an omitted subband among the plurality of subbands constituting the second part.

16. The method of claim 15, wherein the pattern information includes an offset value and a Comb value representing a pattern of the omitted subband.

17. The method of claim 11, wherein the first part includes a rank indicator (RI) and a channel quality indicator (CQI), and wherein the second part includes a precoding matrix indicator (PMI).

18. The method of claim 11, further comprising:

receiving, from the user equipment, additional information for restoring subband precoding matrix indicator (PMI)s corresponding to the omitted some of the second part of the CSI, wherein the subband PMIs corresponding to the omitted some of the second part of the CSI is restored based on the additional information and reported subband PMIs corresponding to reported some of the second part of the CSI other than the omitted some of the second part of the CSI.

19. The method of claim 11, wherein an entirety of the first part is transmitted before the second part is transmitted.

20. A user equipment configured to report channel state information (CSI) in a wireless communication system, the user equipment comprising:

a radio frequency (RF) module;

at least one processor; and at least one computer memory operably connectable to the at least one processor and storing instructions that, when executed by the at least one processor, perform operations comprising:

receiving configuration information related to reporting of the CSI from a base station, wherein the configuration information includes parameters related to omission of the CSI, and wherein the CSI comprises (i) a first part used to identify a number of information bits of a second part of the CSI and (ii) the second part;

receiving downlink control information (DCI) including information regarding a coding rate of the CSI from the base station;

receiving a first reference signal for channel measurement;

measuring a channel based on the first reference signal; and reporting the CSI of the measured channel to the base station through a physical uplink shared channel (PUSCH), wherein the second part of the CSI includes a wideband CSI and a subband CSI, wherein the wideband CSI included in the second part of the CSI has a higher priority than the subband CSI included in the second part of the CSI, wherein some or all of the second part of the CSI is omitted based on a coding rate of the second part being greater than a threshold value, and wherein the threshold value is based on at least one of (i) the DCI or (ii) the parameters related to omission of the CSI.

* * * * *